(12) United States Patent
Nikitidis et al.

(10) Patent No.: US 11,941,918 B2
(45) Date of Patent: Mar. 26, 2024

(54) EXTRACTING INFORMATION FROM IMAGES

(71) Applicant: Yoti Holding Limited, London (GB)

(72) Inventors: Symeon Nikitidis, London (GB); Francisco Angel Garcia Rodriguez, London (GB); Erlend Davidson, London (GB); Samuel Neugber, London (GB)

(73) Assignee: Yoti Holding Limited, London (GB)

( * ) Notice: Subject to any disclaimer, the term of this patent is extended or adjusted under 35 U.S.C. 154(b) by 0 days.

(21) Appl. No.: 18/301,147

(22) Filed: Apr. 14, 2023

(65) Prior Publication Data

US 2023/0252662 A1 Aug. 10, 2023

Related U.S. Application Data

(63) Continuation of application No. 17/107,654, filed on Nov. 30, 2020, now Pat. No. 11,657,525, which is a
(Continued)

(30) Foreign Application Priority Data

Dec. 4, 2018 (GB) ...................................... 1819794

(51) Int. Cl.
*G06V 40/40* (2022.01)
*B29C 64/393* (2017.01)
(Continued)

(52) U.S. Cl.
CPC ............ *G06V 40/40* (2022.01); *B29C 64/393* (2017.08); *B33Y 50/00* (2014.12); *B33Y 50/02* (2014.12);
(Continued)

(58) Field of Classification Search
CPC ...... G06V 40/16; G06V 40/40; G06V 40/168; G06V 40/172; G06V 10/82; G06V 10/454;
(Continued)

(56) References Cited

U.S. PATENT DOCUMENTS 11,281,921 B2 3/2022 Nikitidis et al.
2017/0345146 A1 11/2017 Fan et al.
(Continued)

FOREIGN PATENT DOCUMENTS

CN 108319901 A 7/2018
EP 3888001 A1 10/2021
(Continued)

OTHER PUBLICATIONS

Atoum et al., Face Anti-Spoofing Using Patch and Depth-Based CNNs, Department of Computer Science and Engineering Michigan State University, IEEE International Joint Conference on Biometrics, Oct. 1, 2017, pp. 319-328.
(Continued)

*Primary Examiner* — Daniel G Mariam
(74) *Attorney, Agent, or Firm* — Knobbe, Martens, Olson & Bear, LLP

(57) ABSTRACT

An image processing component is trained to process 2D images of human body parts, in order to extract depth information about the human body parts captured therein. Image processing parameters are learned during the training from a training set of captured 3D training images, each 3D training image of a human body part and captured using 3D image capture equipment and comprising 2D image data and corresponding depth data, by: processing the 2D image data of each 3D training image according to the image processing parameters, so as to compute an image processing output for comparison with the corresponding depth data of that 3D
(Continued)

image, and adapting the image processing parameters in order to match the image processing outputs to the corresponding depth data, thereby training the image processing component to extract depth information from 2D images of human body parts.

10 Claims, 20 Drawing Sheets

Related U.S. Application Data continuation-in-part of application No. 17/058,371, filed as application No. PCT/EP2019/083712 on Dec. 4, 2019, now Pat. No. 11,281,921.

(51) Int. Cl.
| | |
|---|---|
| B33Y 50/00 | (2015.01) |
| B33Y 50/02 | (2015.01) |
| G06F 18/214 | (2023.01) |
| G06N 3/08 | (2023.01) |
| G06T 7/20 | (2017.01) |
| G06T 7/50 | (2017.01) |
| G06T 7/55 | (2017.01) |
| G06T 17/00 | (2006.01) |
| G06V 10/141 | (2022.01) |
| G06V 10/44 | (2022.01) |
| G06V 10/764 | (2022.01) |
| G06V 10/82 | (2022.01) |
| G06V 20/64 | (2022.01) |
| G06V 40/16 | (2022.01) |
| B29L 31/48 | (2006.01) |
| B33Y 30/00 | (2015.01) |
| B33Y 80/00 | (2015.01) |
| G06F 21/32 | (2013.01) |

(52) U.S. Cl.
CPC .......... *G06F 18/214* (2023.01); *G06N 3/08* (2013.01); *G06T 7/20* (2013.01); *G06T 7/50* (2017.01); *G06T 7/55* (2017.01); *G06T 17/00* (2013.01); *G06V 10/141* (2022.01); *G06V 10/454* (2022.01); *G06V 10/764* (2022.01); *G06V 10/82* (2022.01); *G06V 20/647* (2022.01); *G06V 40/16* (2022.01); *G06V 40/168* (2022.01); *G06V 40/172* (2022.01); *B29L 2031/48* (2013.01); *B33Y 30/00* (2014.12); *B33Y 80/00* (2014.12); *G06F 21/32* (2013.01); *G06T 2200/04* (2013.01); *G06T 2207/10021* (2013.01); *G06T 2207/20081* (2013.01); *G06T 2207/20084* (2013.01); *G06T 2207/30201* (2013.01)

(58) Field of Classification Search
CPC .............. G06V 10/764; G06V 20/647; G06V 30/19173; G06F 18/214; G06N 3/08; G06T 7/20; G06T 7/50; G06T 7/55; G06T 17/00; G06T 2200/04; G06T 2207/10021; G06T 2207/20081; G06T 2207/20084; B33Y 50/02

See application file for complete search history.

(56) References Cited

U.S. PATENT DOCUMENTS

| | | |
|---|---|---|
| 2019/0354746 A1 | 11/2019 | Zhang et al. |
| 2020/0167581 A1 | 5/2020 | Zhang et al. |
| 2020/0175260 A1 | 6/2020 | Cheng et al. |
| 2021/0082136 A1 | 3/2021 | Nikitidis et al. |

FOREIGN PATENT DOCUMENTS

| | | |
|---|---|---|
| WO | WO 2019/152983 A2 | 8/2019 |
| WO | WO 2020/115154 A1 | 6/2020 |

OTHER PUBLICATIONS

Combined Search and Examination Report in GB Application No. 1819794.7 dated Sep. 23, 2019.
International Search Report and Written Opinion in PCT/EP2019/083712 dated Feb. 19, 2020.
Wang, et al., Robust Face Anti-Spoofing with Depth Information, Journal of Visual Communication and Image Representation49, 2017, pp. 332-337.

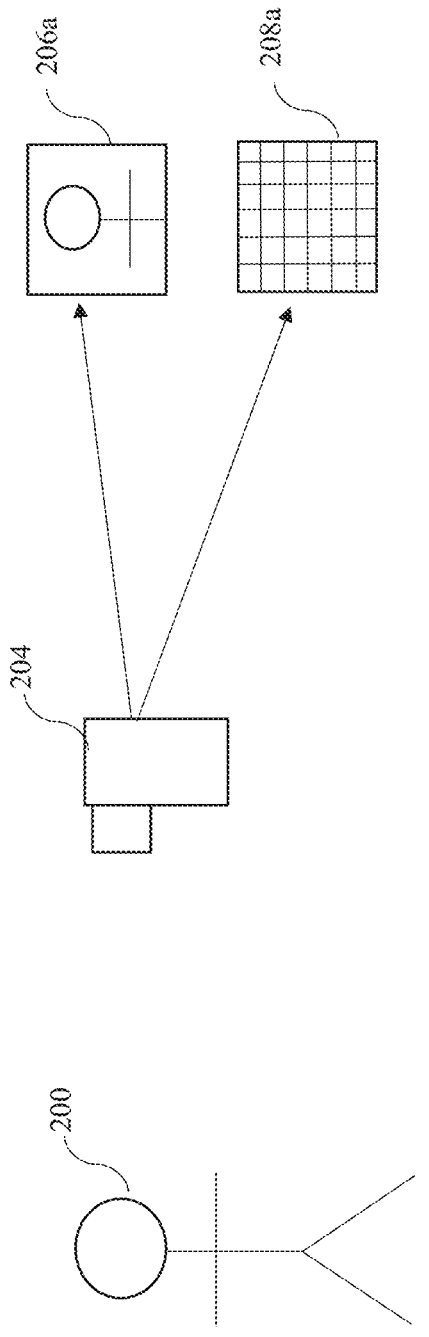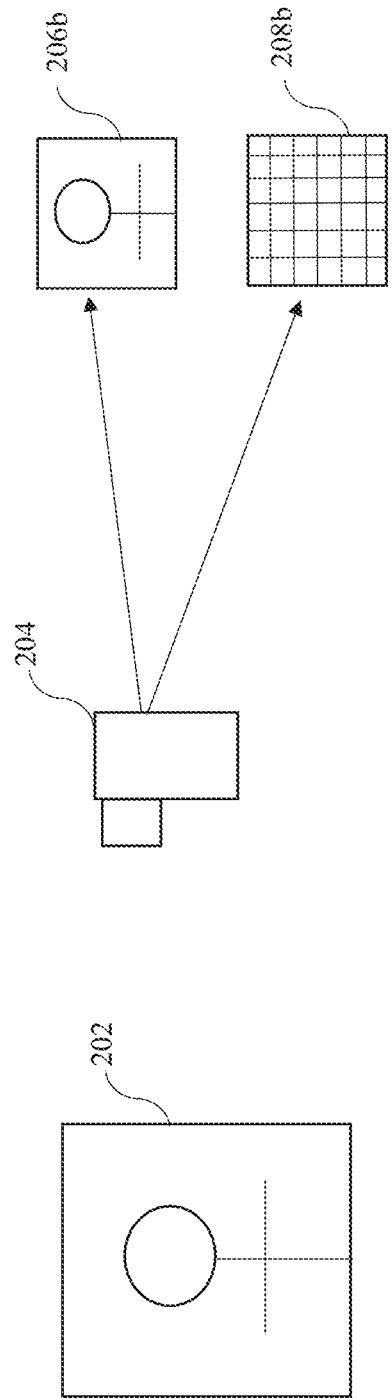

EXTRACTING INFORMATION FROM IMAGES

TECHNICAL FIELD

This disclosure relates to technology for extracting information from images.

BACKGROUND

Sper

There are many contexts in which information may be usefully extracted from facial images. For example, certain forms of image recognition may be used to identify users from facial characteristics captured in still or moving (video) images.

Another context is anti-spoofing. Anti-spoofing refers generally to technology for distinguishing between an actual human and a spoofing entity masquerading as such. In the context of device security and the like, a spoofing attack refers to a technique whereby an unauthorised entity attempts to "spoof" a system in order to gain illegitimate access to a restricted function.

A particular class of spoofing occurs in contexts where image-based face authentication or other image-based verification processes are used. In such cases, a user may attempt to spoof the system using a pre-captured photograph or image of another user, which may be presented on either paper or a digital device such as a phone screen In this context, anti-spoofing refers to techniques of detecting whether an entity, which may exhibit what are ostensibly human characteristics, is actually a real, living being or is a non-living entity masquerading as such (spoofing entity). This may also be referred to as liveness detection. Such techniques have, for example, been implemented in modern mobile devices (such as smartphones) to provide anti-spoofing in the context of biometric authentication.

Anti-spoofing can be based on 3D structure detection in which a spoofing entity is detected based on discrepancies between the 3D structure of the spoofing entity and an actual human. This is particularly effective for detecting 2D spoofing entities such as a photograph or video of a person on a display. This can make use of 3D image capture equipment. For example, some modern smart phones include 3D depth detection technology on infra-red projection to provide facial verification with anti-spoofing safeguards. Other techniques look for the presence of 3D structures in 2D images during intervals of relative motion between an image capture device and an entity being verified. These do not require 3D imaging equipment, but generally do require a user to perform a predetermined motion to capture the necessary motion effects.

Such techniques are not limited to faces. For example, biometric authentication may be based on palm or fingerprint images. In that context, anti-spoofing may be applied to try to determine whether a hand is real or fake.

SUMMARY

The present invention allows depth information to be extracted from 2D (two-dimensional) facial images using machine learning (ML) processing, such as convolutional neural network (CNN) processing. This means information about 3D facial structure can be obtained without the use of 3D image capture equipment and without the user necessarily having to perform specified motion when the facial images are captured.

A first aspect herein provides a computer-implemented method of training an image processing component to extract depth information from 2D images, the method comprising:
training the image processing component to process 2D images of human body parts according to a set of image processing parameters, in order to extract, from the 2D images, depth information about the human body parts captured therein;
wherein the image processing parameters are learned during the training from a training set of captured 3D training images, each 3D training image of a human body part and captured using 3D image capture equipment and comprising 2D image data and corresponding depth data, by:
processing the 2D image data of each 3D training image according to the image processing parameters, so as to compute an image processing output for comparison with the corresponding depth data of that 3D image, and
adapting the image processing parameters in order to match the image processing outputs to the corresponding depth data, thereby training the image processing component to extract depth information from 2D images of human body parts.

A second aspect herein provides executable instructions embodied in non-transitory computer-readable storage, the executable instructions configured, when executed on one or more hardware processors, to implement:
a machine learning image processing component configured to:
receive a 2D image captured by a 2D image capture device, and
extract, from the 2D image, depth information about a human body part captured therein, according to a set of learned image processing parameters, the image processing parameters having been learned from 3D training images captured using 3D image capture equipment.

BRIEF DESCRIPTION

For better understanding of the present invention, and to show how embodiments of the same may be carried into effect, reference is made to the following figures in which:

FIGS. 4A and 4B illustrate how training data may be collected;

Figure 9:
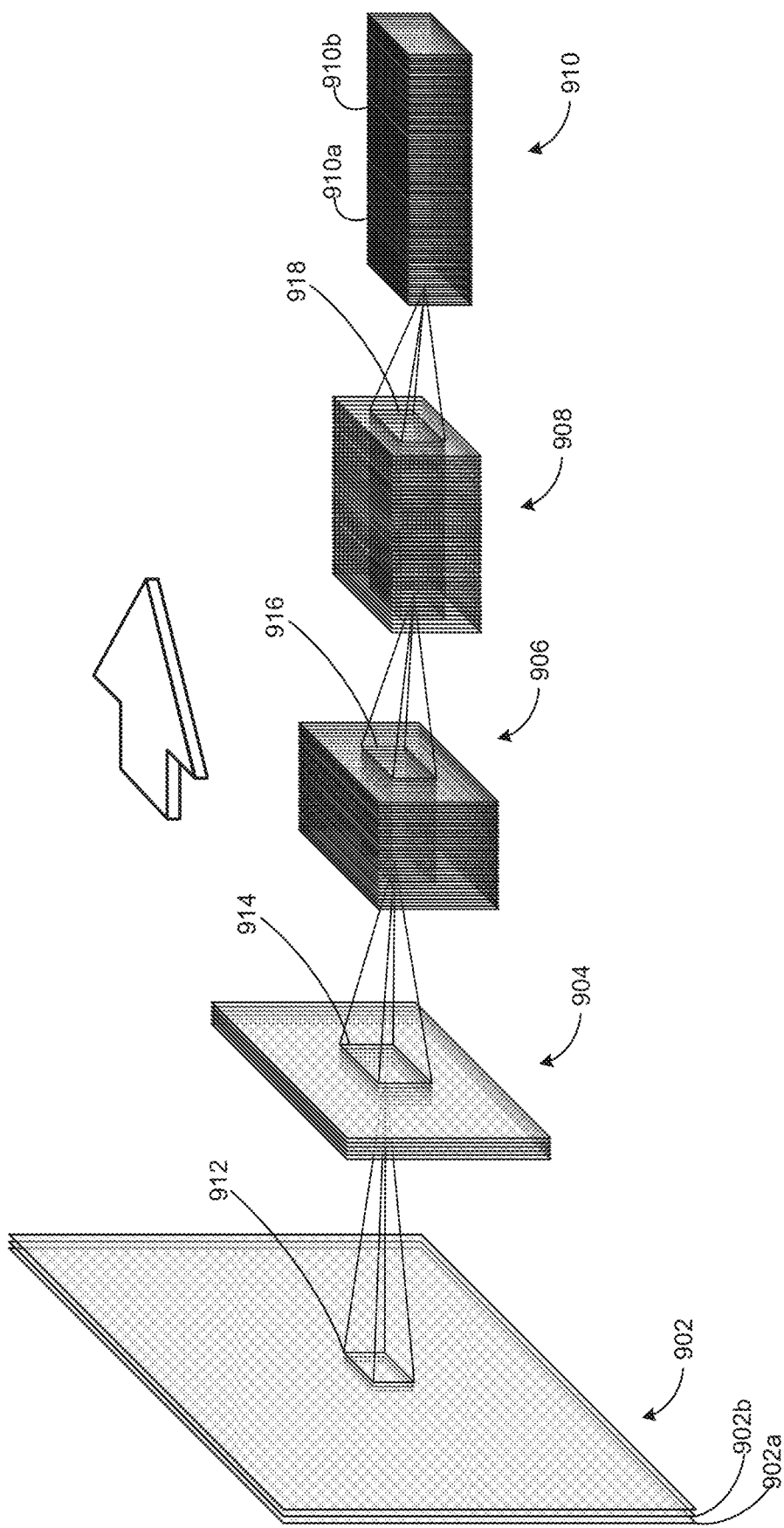
FIG. 9 illustrates high level principles of data processing operations performed within a convolutional neural network.
Figure 9A:
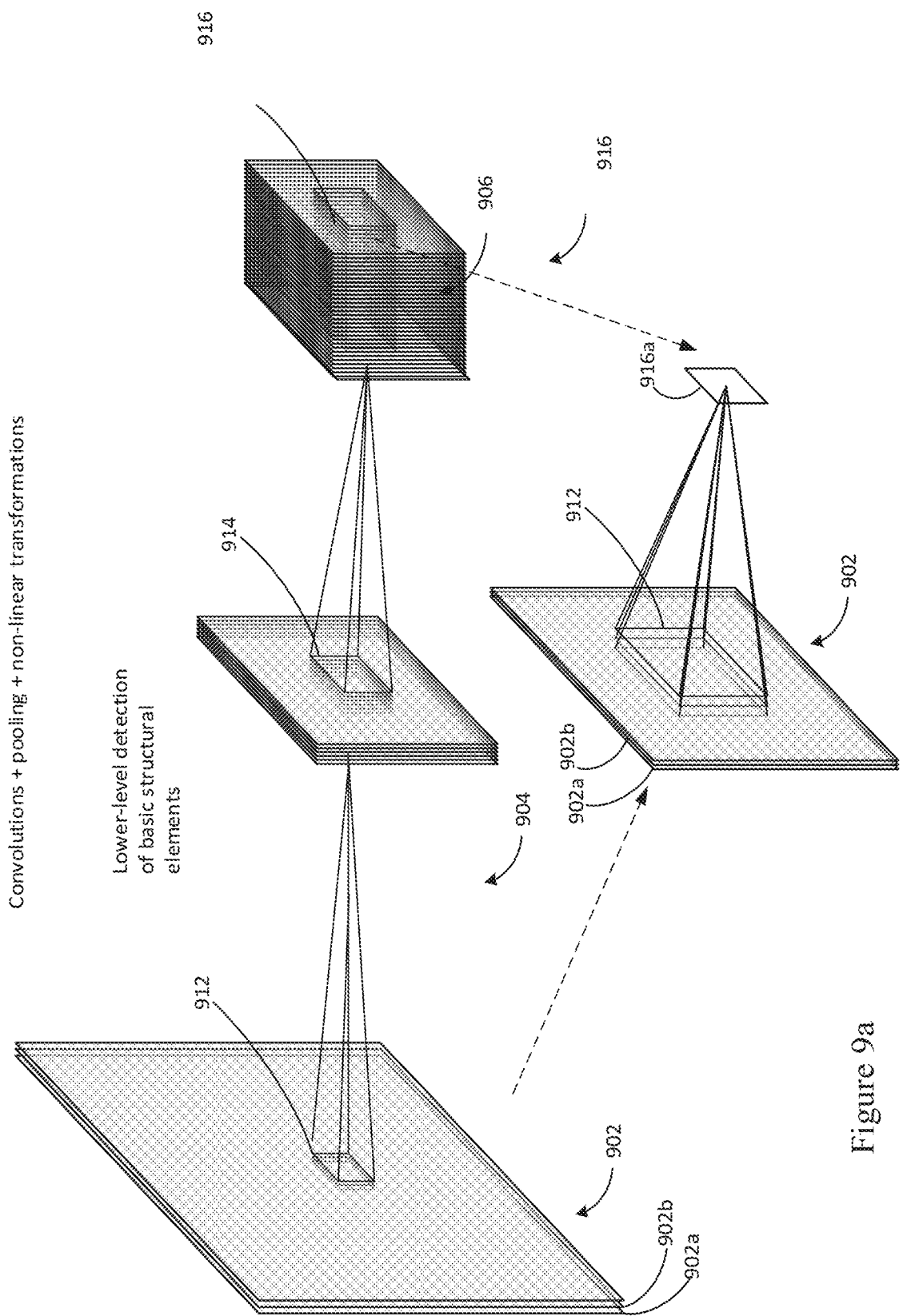
Figure 10:
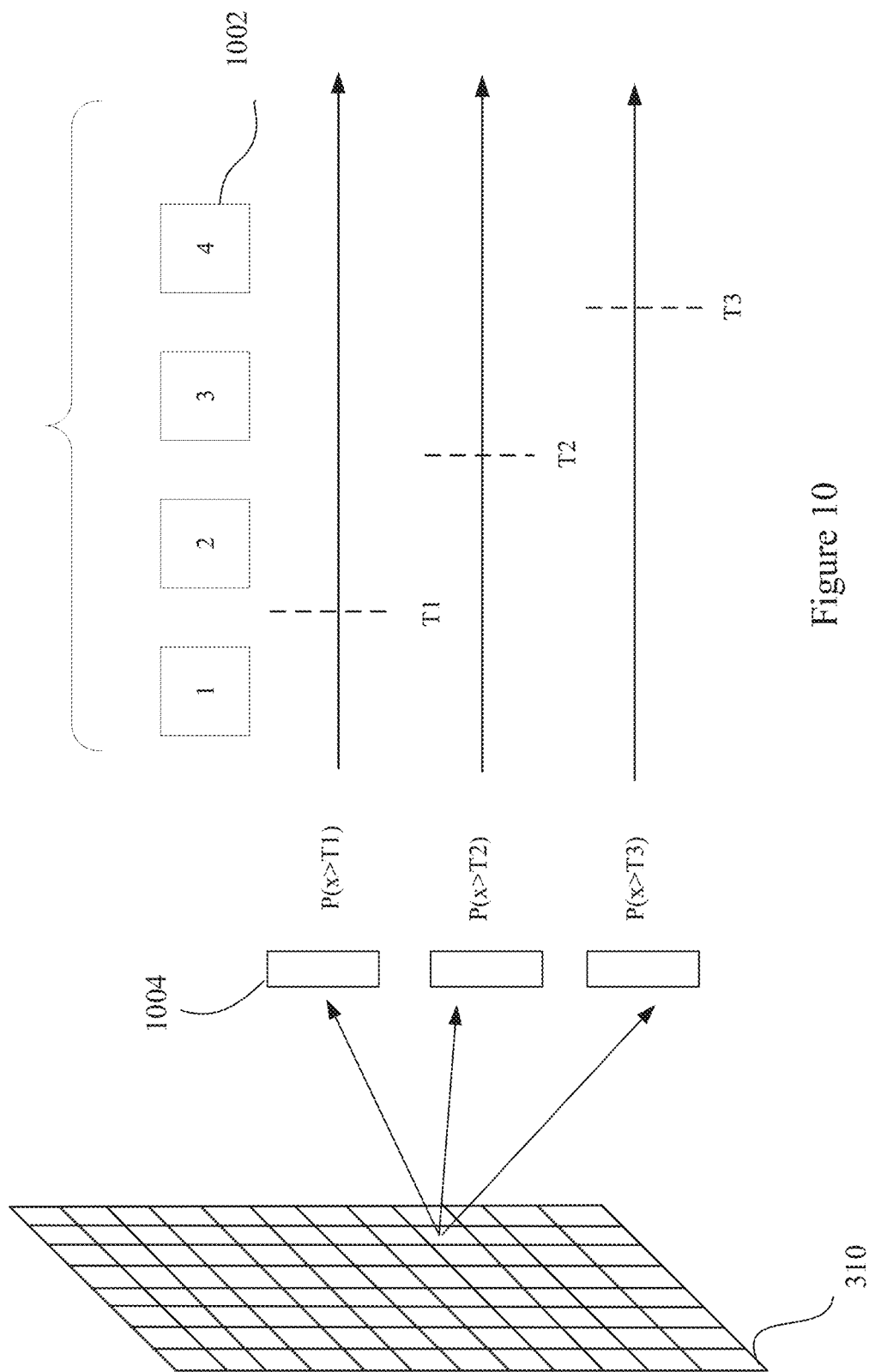
Figure 11:
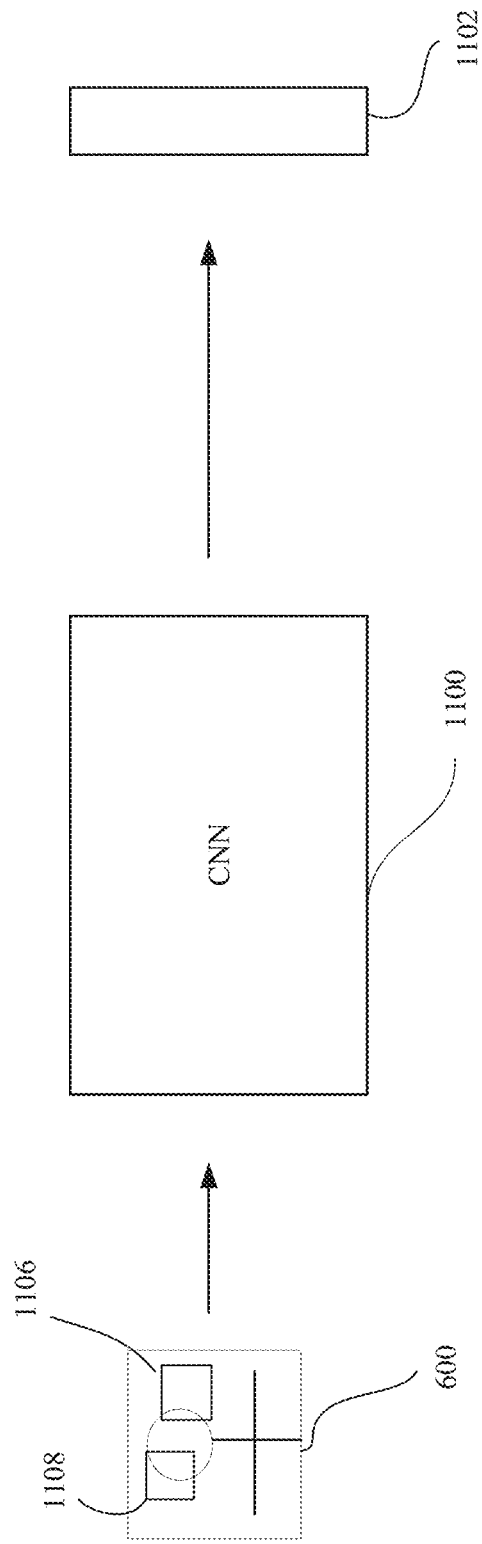
Figure 12:
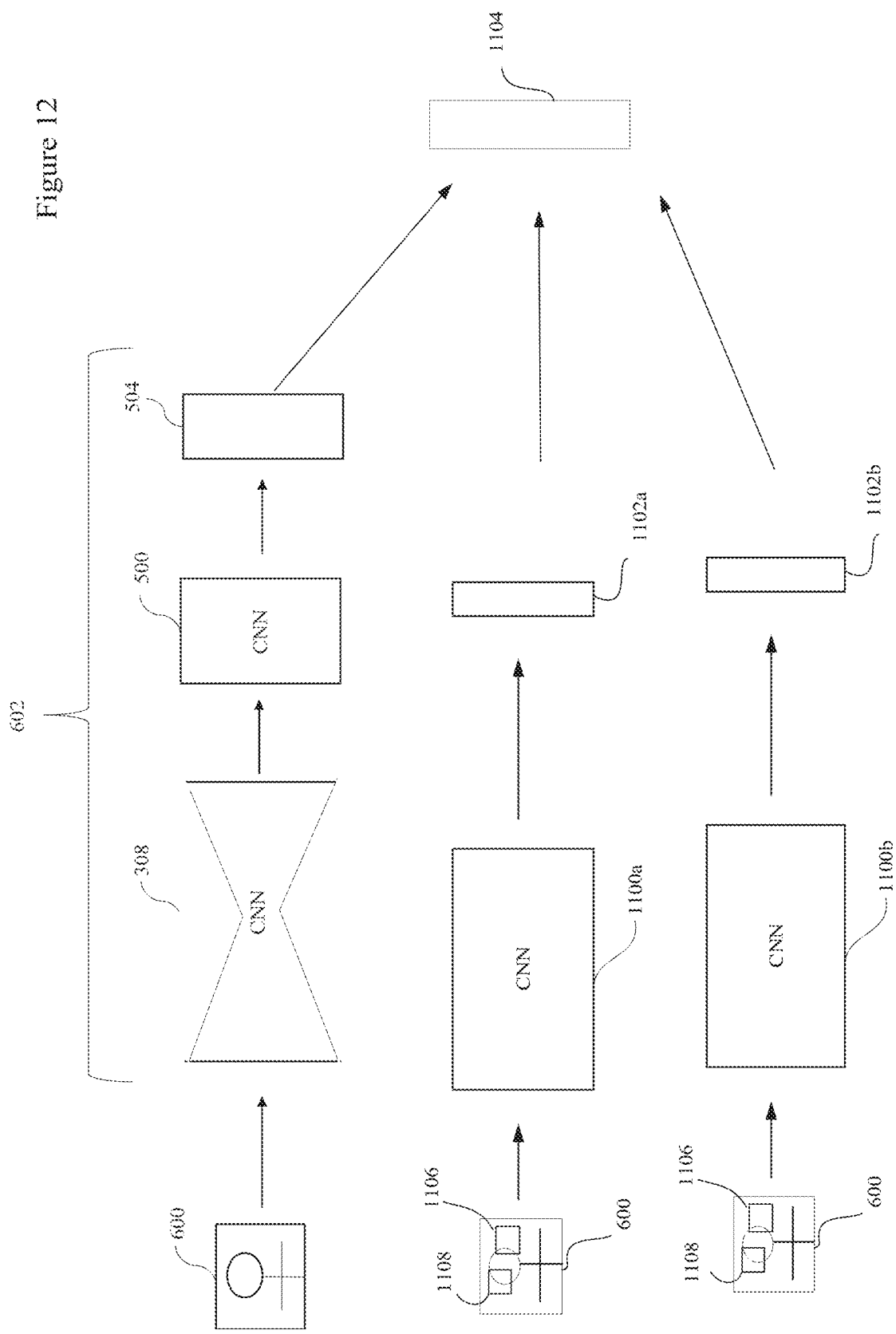
Figure 13:
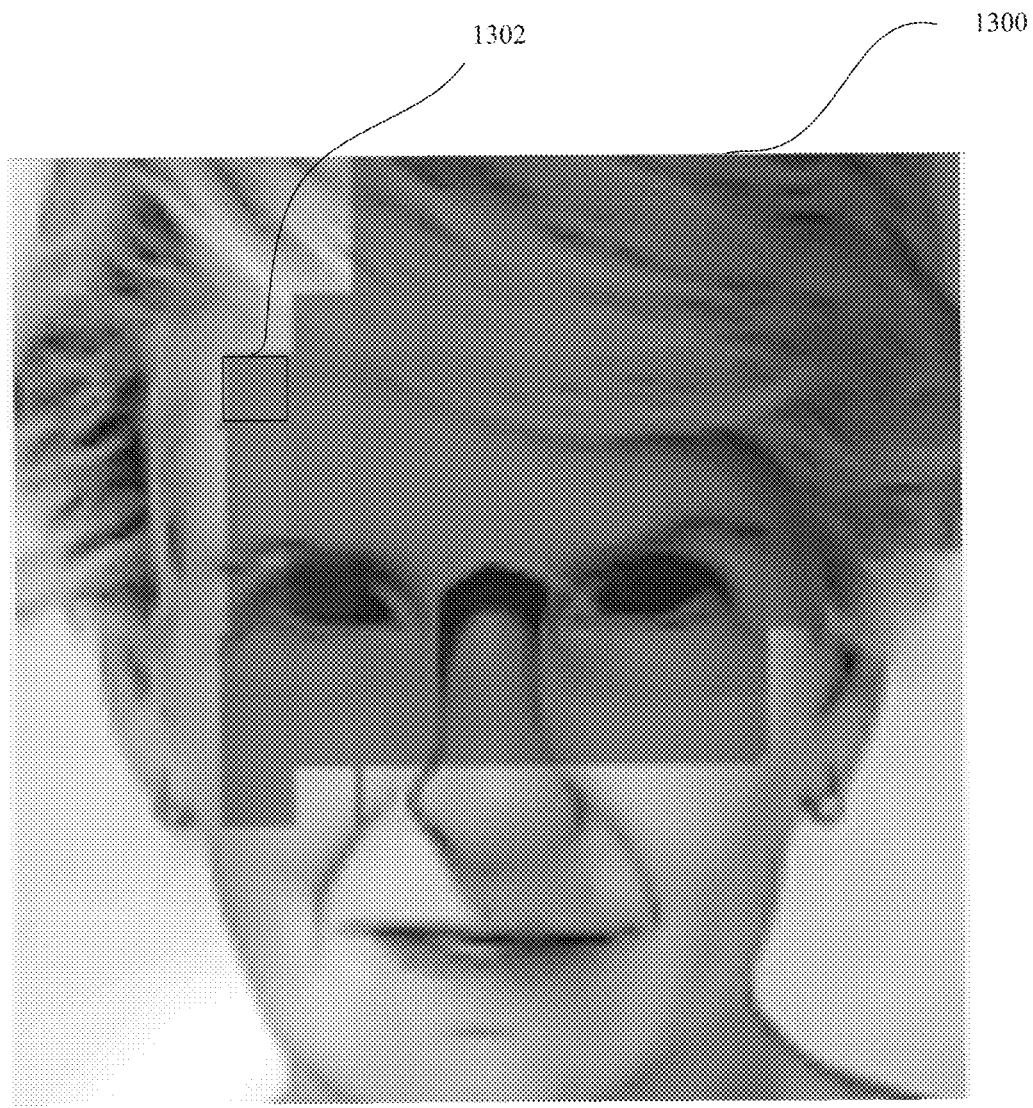
Figure 14:
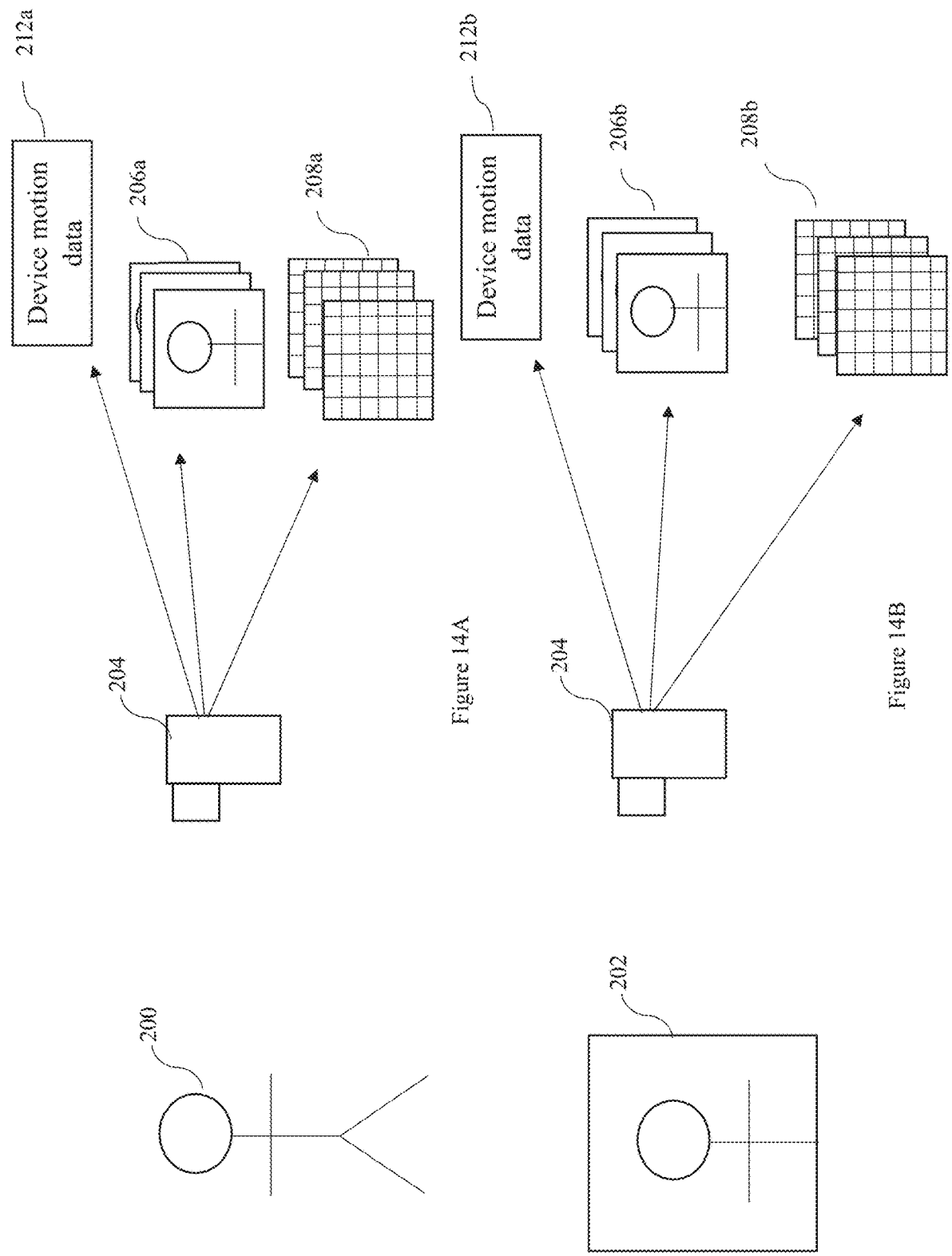
Figure 15:
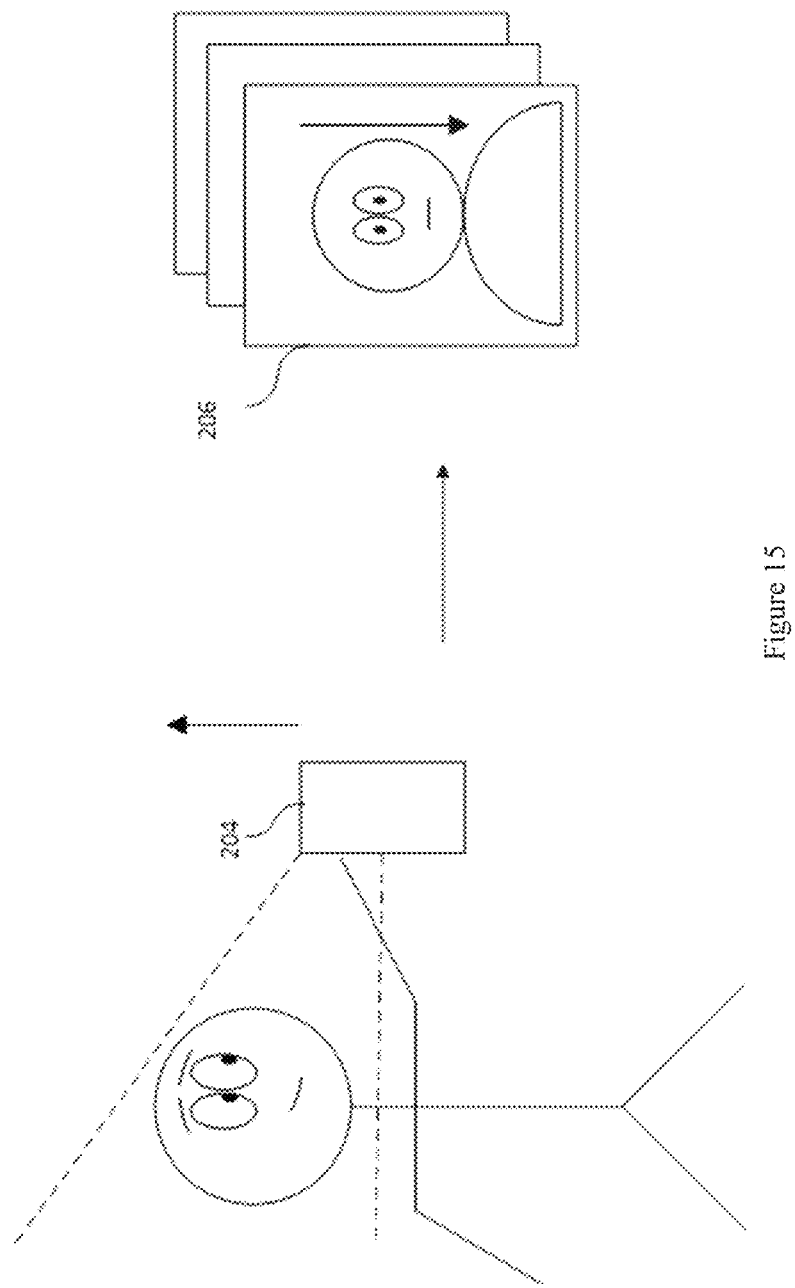
Figure 16:
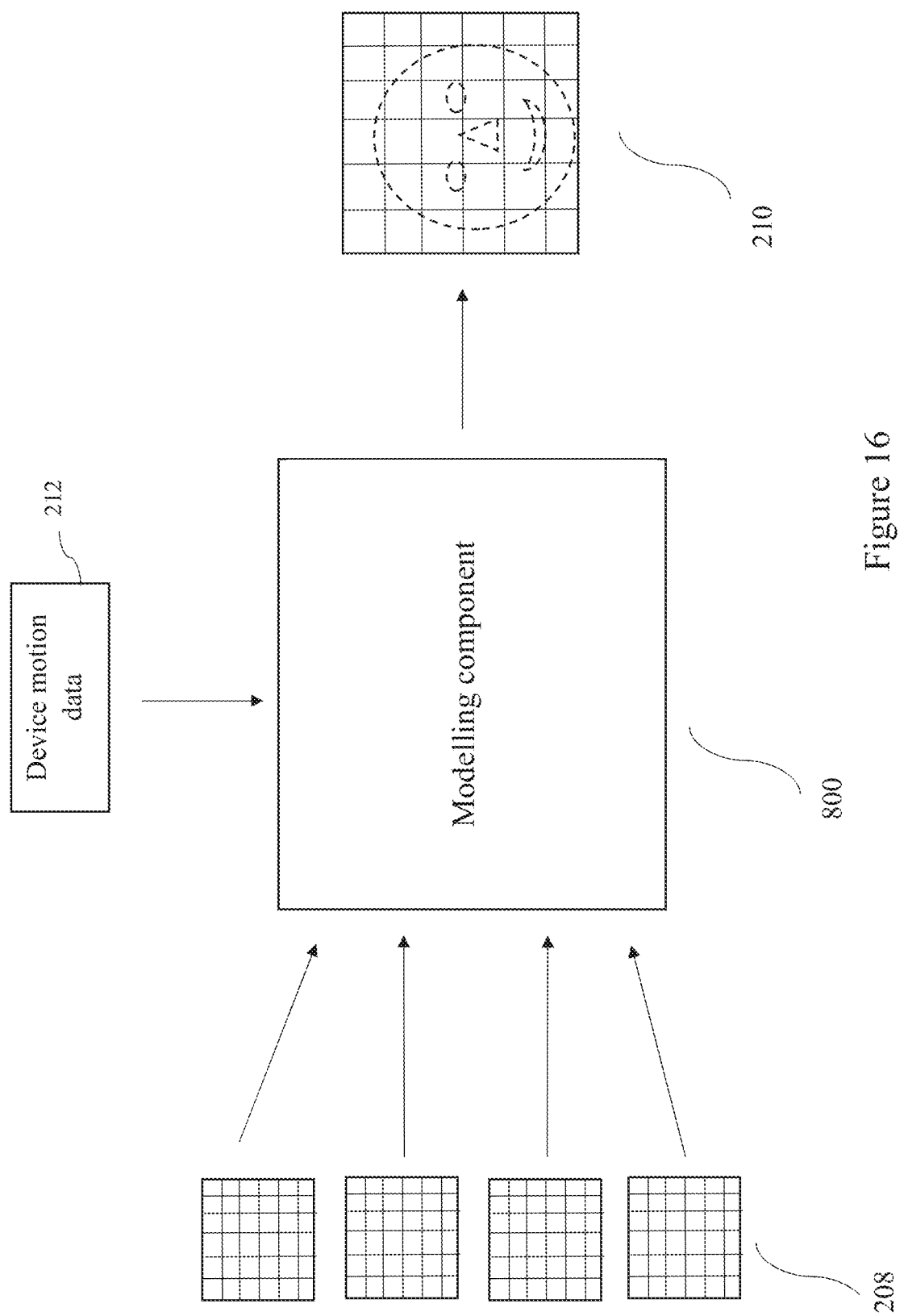
Figure 17A:
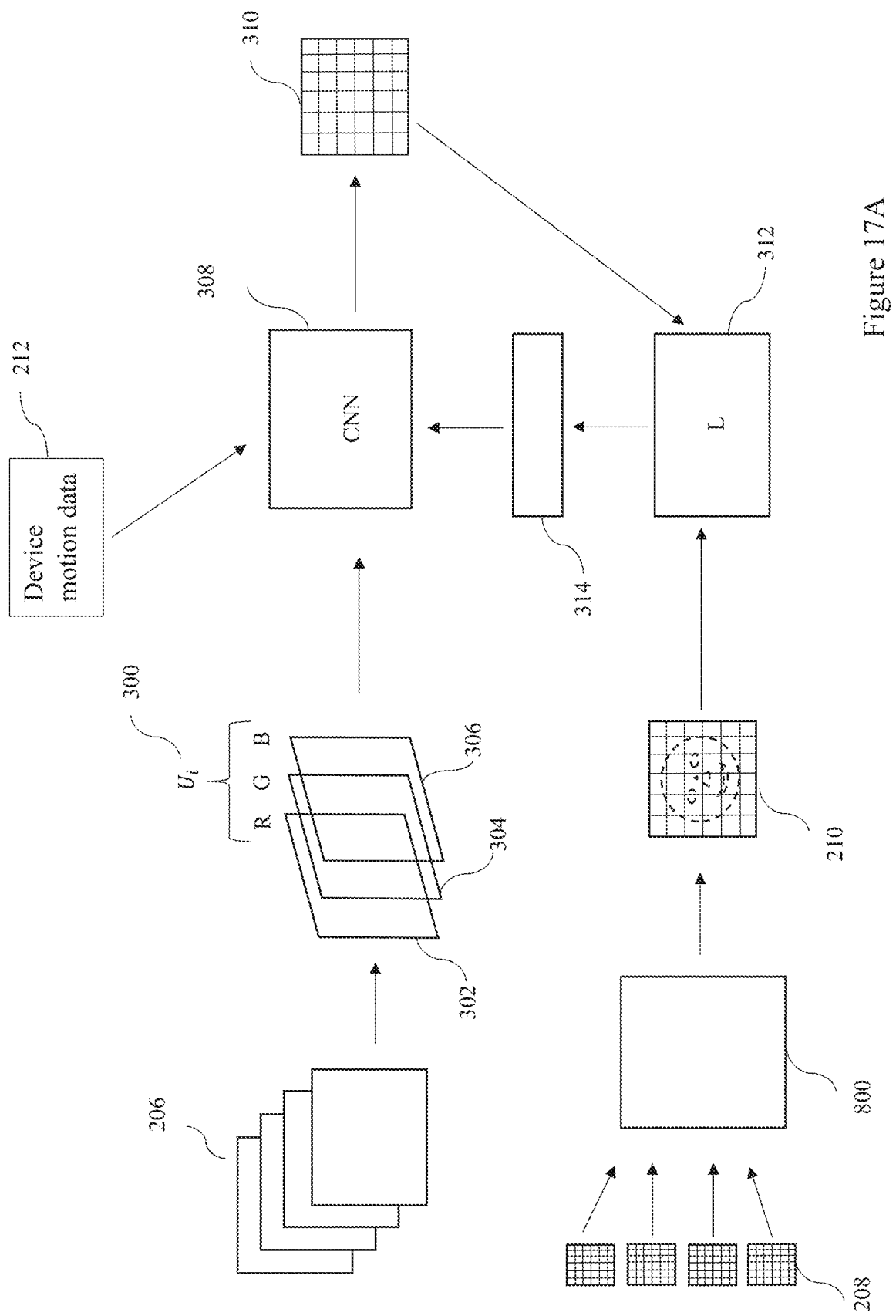
Figure 17B:
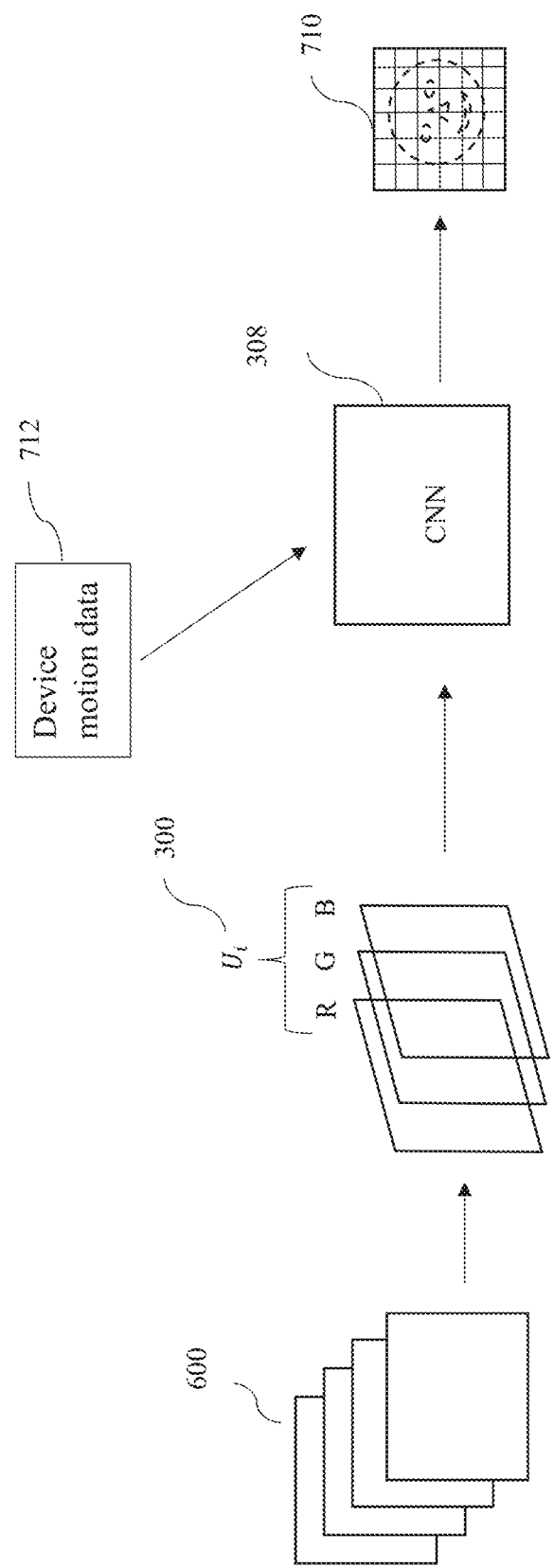

FIG. 9a schematically illustrates the relationship between a set of convolutional filtering layers in a CNN and an image patch within an original image;

FIG. 10 shows a schematic block diagram of an ordinal regression architecture;

FIG. 11 shows an example of a localized, patch-based anti-spoofing component;

FIG. 12 shows an example of an anti-spoofing system with a global depth estimator and two separately-trained patch-based anti-spoofing components;

FIG. 13 shows a spoofing "heatmap" overlaid on an image from which it is derived;

FIGS. 14A and 14B illustrate how multi-frame training data may be collected;

FIG. 15 shows an example of an image capture process using motion;

FIG. 16 shows the generation of a canonical depth map;

FIG. 17A shows how a Convolutional Neural Network (CNN) can be trained to predict the depth of pixels in a multi-frame 2D image; and FIG. 17B shows the use of a trained image component to predict depth information.

Figure 18:
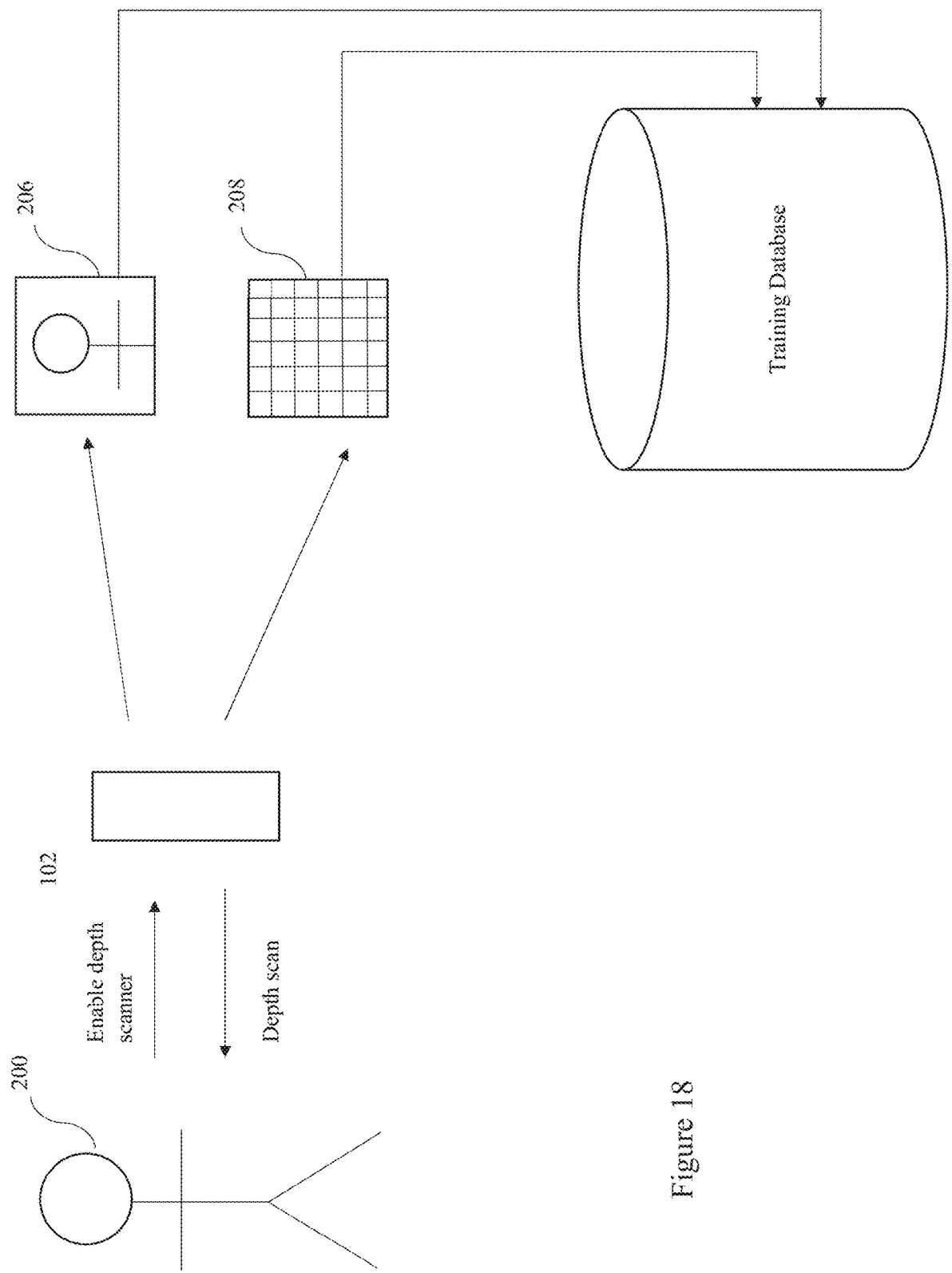

FIG. 18 shows the collection of depth data from users of a mobile device.

DETAILED DESCRIPTION OF THE DRAWINGS

Embodiments of the present invention will now be described by way of example only. The described embodiments relate generally to the extraction of depth information from 2D images using deep learning, or machine learning more generally. The embodiments are described initially in the context of an anti-spoofing system, but can be applied more generally, and other possible applications are described later. In an anti-spoofing application context, depth information extracted from a 2D static or video image is used to assess whether an entity to which the extracted depth information relates is a real face (or other human body part) or a spoofing entity masquerading as such. Other applications include, without limitation, biometric authentication using depth information about a face or other human body part extracted from a 2D image, or using extracted depth information to create a custom-fit garment for a user. Herein, the terms "video", "moving" and "multi-frame" are used synonymously in relation to images; likewise, the terms "static", "still" and "single-frame" are used synonymously in relation to images.

Figure 1:
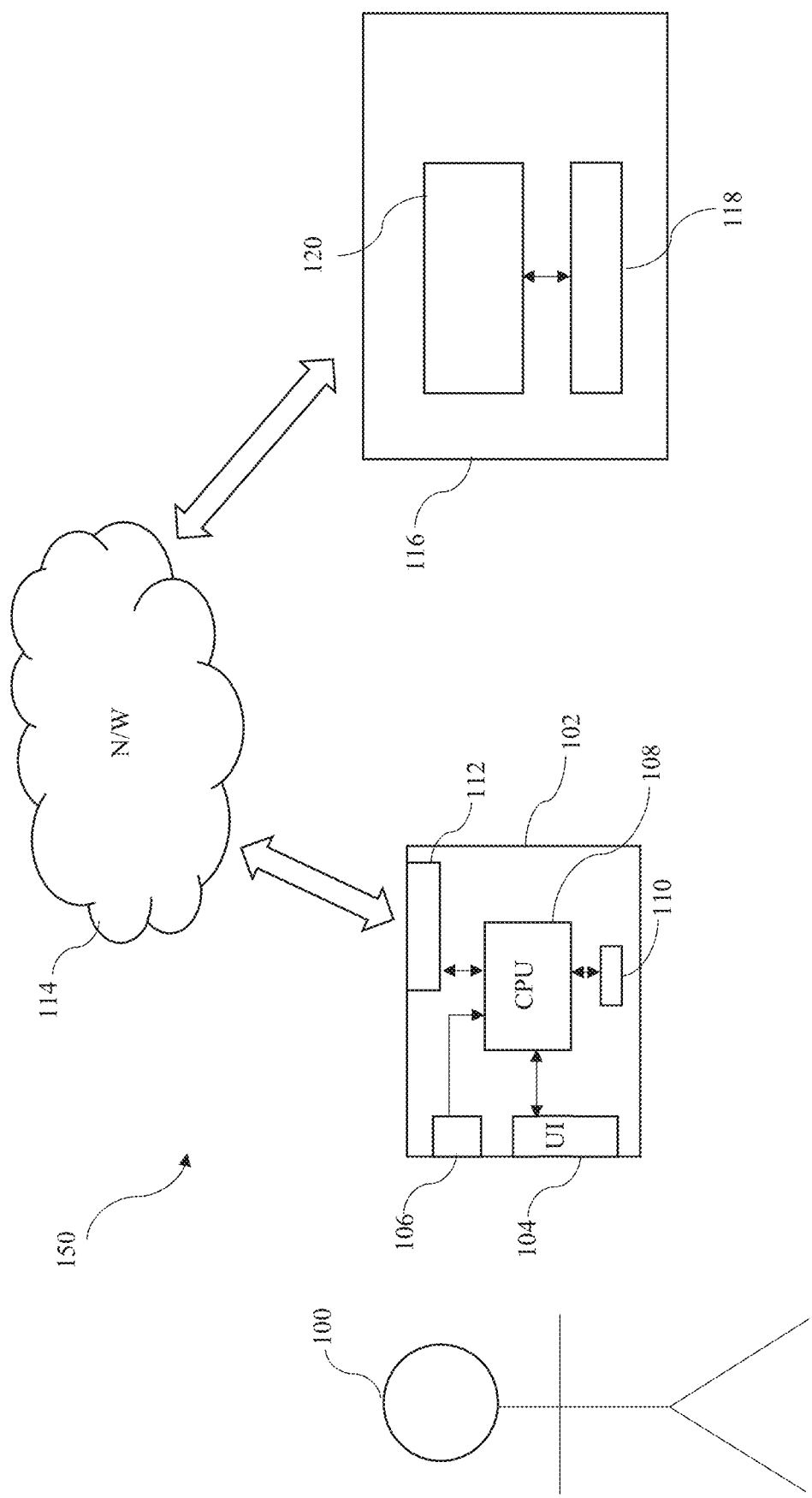
FIG. 1 shows a schematic block diagram of a computer system in which anti-spoofing is implemented.

FIG. 1 shows a highly schematic block diagram of a computer system 150 comprising a computer device 102 at which a user 100 may be verified. The computer device 102 may, for example, a user device, for example, a smart phone, tablet, personal computer etc. In the following, the computer device 102 is referred to as a user device although the relevant description applies to any computer device. The user device 102 comprises an image capture device 106 (camera) which can be used to capture images of the user 100 of the device 102.

Such image data is used as a basis for anti-spoofing, which requires the user 100 to allow at least one 2D image of himself (verification image) to be captured by the image capturing device 106. An anti-spoofing check is performed to verify that it is indeed an actual human in the verification image, as opposed to a photograph, or video (played back on a mobile device, for example) of a human, or other spoofing entity that may have human characteristics.

The user device 102 is shown to further comprise at least one processor 108 such as a CPU (central processing unit). The CPU may be configured to execute at least one restricted function, to which access by the user 100 is restricted subject, at least in part, to anti-spoofing checks. Examples include, for example, functions that provide access to secure data or any other secure functionality to which access is regulated. Alternatively, these restricted functions may be accessed and executed remotely, for example, on remote server 116.

The user device 102 also comprises a user interface (UI) 104 via which user inputs may be received from the user 100 and information may be outputted to the user 100. The UI 104 may, for example, comprise any suitable combination of input and output devices, such as a display and associated touch screen. Other input devices such as keyboards or mice may be used by the user 100, along with one or more output devices such as a display. Although shown as a separate component, the image capture device 106 may be considered part of the UI 104 for example where gesture inputs are provided via the image capture device 106.

The user device 102 is shown to also comprise a memory 110 in which computer programs are stored for execution on the processor 108, along with any associated data.

The user device 102 may comprise one or more inertial sensors, such as an accelerometer, gyroscope and/or magnetometer, for monitoring the movement of the user device. Such motion sensors can be used to capture the motion of the device.

The user device 102 also comprises a network interface 112 via which the user device 102 can connect to a network 114, such as the Internet. The user device 102 is able to connect, via the network 114, to a back-end system comprising at least one remote server 116. The back-end system forms part of the computer system 150. The remote server comprises a processor 120 for executing computer programs. It also comprises a memory 118 in which computer programs are stored for execution on the processor 120 along with any associated data. The computer programs may, for example, have restricted features which the user 100 needs to be verified to access.

Figure 2:
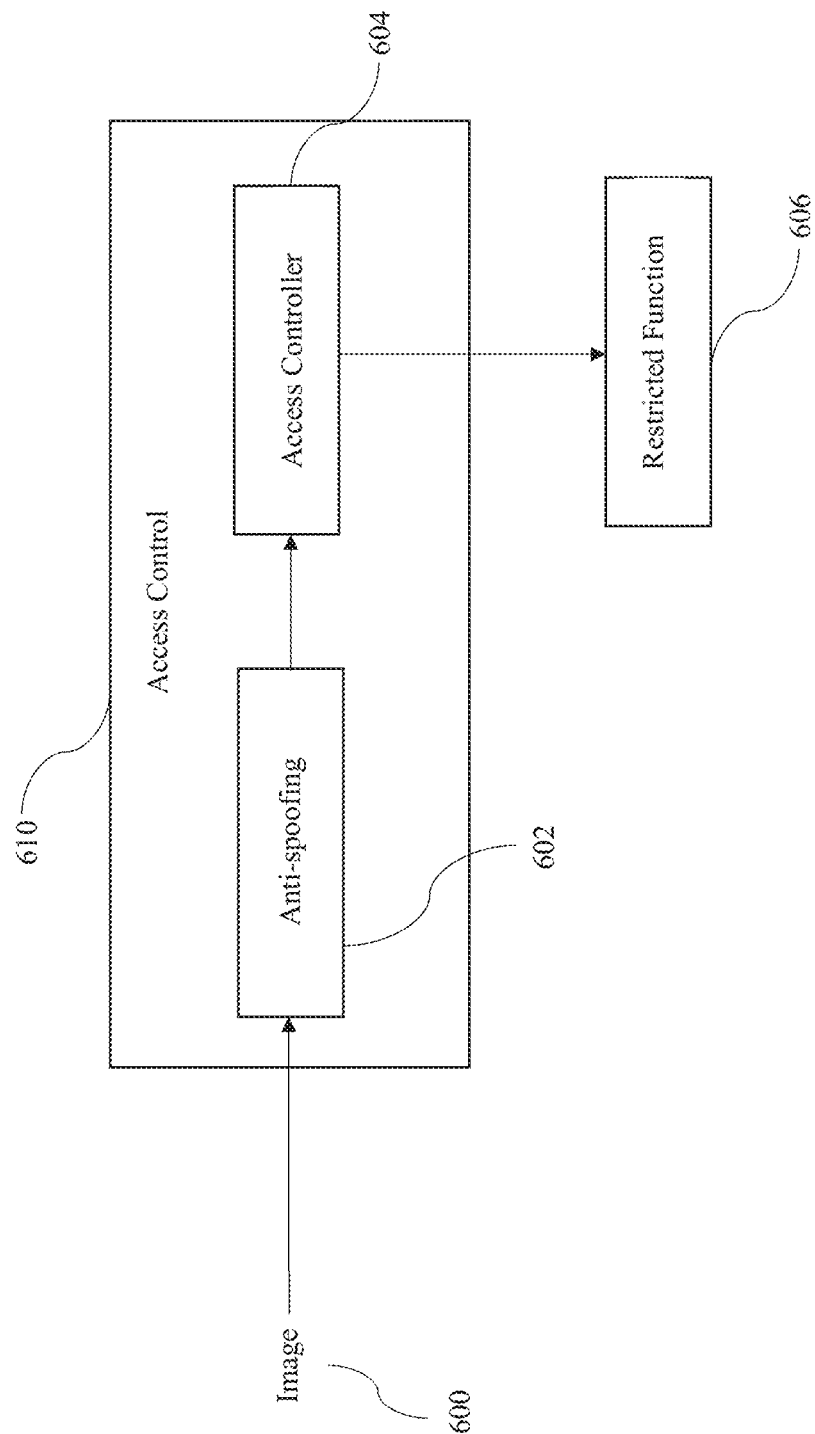
FIG. 2 shows a schematic functional block diagram of an access control system.

FIG. 2 shows a functional block diagram of an example of an access control system 610. The access control system is used to determine if the user 100 should be granted access to a restricted function 606.

A two-dimensional (2D) verification image 600 is captured and inputted into the verification system 610. It first passes to an anti-spoofing module 602, which determines if the image 600 is of a real human or of a spoofing entity. The output of the anti-spoofing module 602 is fed into the access controller 604. The access controller 604 can then determine whether or not to grant the user of the computer device 102 access to the restricted function 606 based on the output of the anti-spoofing module.

The access control system 610 can be implemented at the hardware level in a variety of ways. For example, in one case its functionality can be implemented entirely locally at the computer device 102 of FIG. 1. Alternatively, this functionality may be implemented at the backend 116 and, in that case, decisions made at the backend 116 can be communicated to the computer device 102 via the network 114 as necessary to give effect to those decisions. Alternatively, the functionality can be implemented in a distributed fashion, for example with part of it being implemented at the computer device 102 and part being implemented at the backend 116, with communication taking place between those two systems via the network 114 as needed to do so.

The access control system 610 may have additional components to determine if the user should be granted access to the restricted function 606. For example, a face recognition module may be included to determine whether a face in the image 600 matches the face of a known authorised user.

The access control technology disclosed herein can be applied in a variety of contexts using a variety of devices, systems etc.

For example, the anti-spoofing method described above may be used to determine if access to the restricted function 606 is granted to an entity. This method may be used in conjunction with other verification methods, such as facial verification, to determine if the entity is the permitted user of the restricted function. For example, the restricted function may be an electronic payment function. A spoofing attack may be attempted by using a photograph or recording of the permitted user or another 2D spoofing entity. This photograph or recording may be held up to the camera 106 of user device 102 to generate the image 600 which is input into the access control system 610. This image would pass a facial verification test, as it is an image of the verified user, but the anti-spoofing module 602 of the above system would identify that the image is not of an actual human, but of an image of a human, and thus a spoofing entity, so access to the restricted function 606 would be denied. This additional stage of the access control process increases the difficulty for an attacker to access any restricted functions or information, so increasing the security of user data or restricted functions.

As another example, anti-spoofing embodiments can also be applied in conjunction with age estimation based on images, for example in order to regulate online purchases of age-restricted goods or services or to regulate access to certain age-restricted content online. Another context is in physical retail outlets with self-service technology. Here the computer device 102 may for example be a self-checkout terminal or a handheld "self-scanning" device which a user uses to scan items they wish to purchase as they select them.

In such contexts, where a user wishes to purchase age-restricted items, they may be prevented from doing so if they do not successfully pass the user verification checks that are disclosed herein, or at least may be prevented from doing so subject to further age verification procedures.

Figure 3:
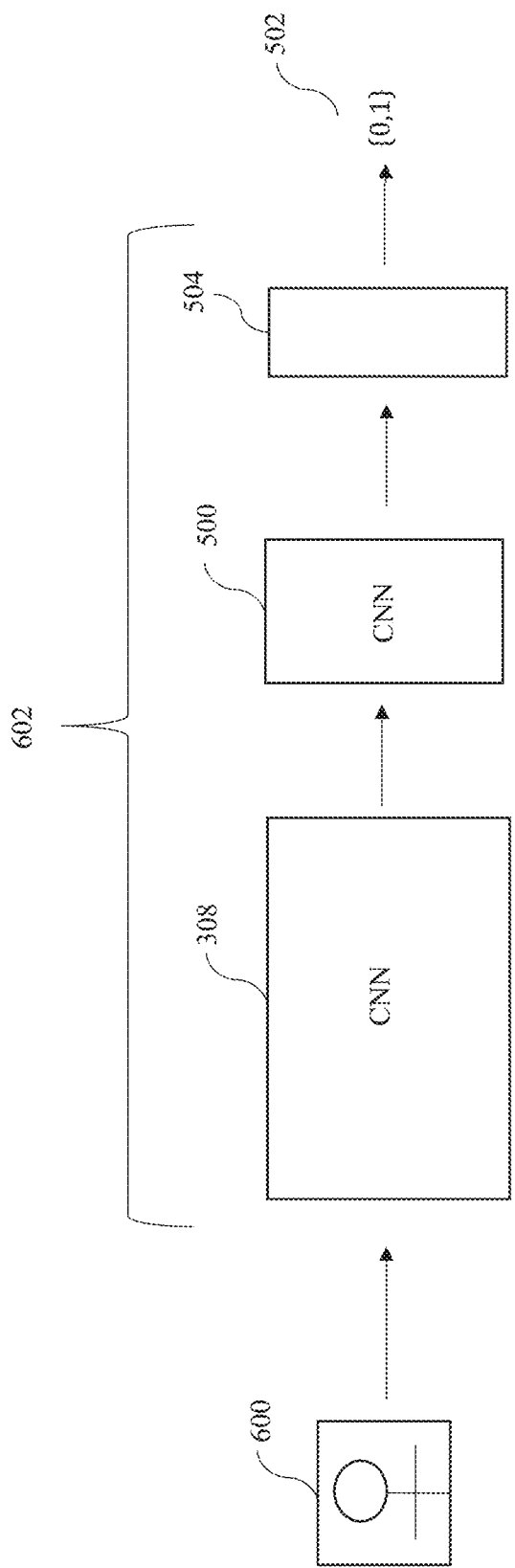
FIG. 3 shows a functional block diagram of a trained anti-spoofing system.

FIG. 3 shows fuller details of the anti-spoofing module 602, which is in the form of a neural network.

The anti-spoofing module 602 comprises an image processing component 308, a feature processing component 500, and an anti-spoofing classifier 504, as shown in FIG. 3. The image processing component 308 and feature processing component 500 are ML processing components having a CNN architecture, the principles of which are described later. The anti-spoofing classifier 504 is also a ML component, and may for example comprise a fully connected softmax layer. The 2D verification image 600 is captured using the image capturing device 106 of user device 102. This image 600 in non-spoofing instances would be of user 100, but may be a spoofing entity, such as a photograph or a video of a user when a spoofing attack occurs.

As will be appreciated, an ML processing component with a CNN architecture is comprised of processing layers, which apply a series of convolution operations and non-linear transformations to data 'volumes' within the CNN architecture. The processing at each layer is performed according to model parameters in the form of weights that are learned in training. A schematic block diagram that demonstrates some of the principles of data processing within a CNN is shown in FIG. 9, and described in more detail below.

The image 600 is passed to the image processing component 308, which outputs to feature processing component 500, which, in turn, outputs to the anti-spoofing classifier 500. The final output of the classifier 504 is a classification output 502 classifying the entity for which the image 600 in relation to a set of anti-spoofing classes. In the present example, this is a binary classification in relation to 'real' and 'spoofing' classes only.

To train the ML processing components to function as above, a two-phase training method is applied.

The image processing component 308 is trained to extract depth features from 2D images in a pre-training phase, and the anti-spoofing classifier 504 is trained to perform anti-spoofing classification in the fine-tuning phase. This is a form of "transfer learning" as it is known in the art. The feature processing component 500 is an optional extension which is trained, together with the anti-spoofing classifier 504 in the fine-tuning phase, to refine the depth features provided by the image processing component 308 for the anti-spoofing classification. In certain contexts, this may improve performance, but it is not required in all embodiments.

The verification image 600 can be a single-frame (static) image but it could also be a multi-frame image (video image, formed of a sequence of static images/frames). In the latter case, the image processing component 308 is trained to predict a depth estimate from multiple RGB frames, and can learn to take into account any motion features that exhibited across two or more RGB frames that are relevant to depth estimation.

Pre-Training Phase:

In the pre-training phase, the image processing component 308 is trained using both images of living humans 200 and images of spoofing entities 202, such as photographs or videos of humans. FIGS. 4A and 4B show how the training data may be collected using at least one three-dimensional (3D) image capturing device 204. The 3D image capture device 204 captures depth information that can be used to automatically label an associated 2D image for training. 3D image capture equipment is only required for the purpose of collecting training data. In training, the image processing component 308 learns to approximate the depth output of the 3D image capture device 204 given only a 2D image, with the consequence that 3D image capture equipment is not required when the trained system is in use.

The 3D image capturing device 204 is used to capture image data of both actual humans 200 and spoofing entities 202. The spoofing entities 202 may include static or moving (video) images of people. The image data captured by the 3D image capturing device 204 comprises two-dimensional (2D) image data 206*a*, 206*b* such as an RGB image, and corresponding image depth data 208*a*, 208*b*, such as a depth map associating a depth value to each of at least some of the pixels in the 2D image. The 2D image and associated depth data constitutes a 3D image which may, for example, be encoded as an RGBD (Red Green Blue Depth) image, which assigns colour and depth values to each image pixel. In a multi-frame implementation, the 2D image data 206*a*, 206*b* in each case takes the form of a sequence of multiple RGB frames. A multi-frame implementation is described in further detail below.

The associated depth data can be any form of depth data captured using 3D imaging equipment (depth map(s), point cloud(s) etc.).

The 3D image capturing device 204 may be embodied in a user device such as a smart phone which is fitted with depth sensors, of the kind typically found on higher-end smartphones to provide secure facial verification and the like. Although a single image capture device 204 is depicted, different training images may be captured using different image capturing devices.

FIG. 4A shows the 3D image capturing device 204 generating 2D image data 206a and corresponding image depth data 208a when capturing image data of actual human 200.

FIG. 4B shows the 3D image capturing device 204 generating 2D image data 206b and corresponding image depth data 208b when capturing image data of spoofing entity 202. If, for example, the spoofing entity 202 is a still image of the actual human 200, the 2D image data 206a, 206b generated by the 3D image capturing device 204 may exhibit relatively subtle differences. However, the image depth data collected 208a, 208b will vary significantly between the two sources.

The 3D training images captured may be of the same individuals, such that the spoofing entity 202 is an image of the real human 200. If the image processing component 308 is trained using 3D training images of different individuals for the living humans 200 and spoofing entities 202, the model may learn to map depth information to the identity of the individual. Thus, 3D training images of the same individual in both real human 200 and spoofing entity 202 form are used in the pre-training phase.

The 2D image data 206a, 206b may be 2D facial images. However, it will be appreciated that, in some contexts, other parts of the body may be imaged. For example, if the access control system included a module for fingerprint verification, the 2D verification image 600 used may be of a user's hand. Therefore, in order to train the image processing component 308 to estimate the depth in the verification image 600, the 2D image data 206a, 206b may be of hands.

The data collection of FIG. 4B is specific to anti-spoofing. For other applications, e.g. facial authentication, garment customization etc., such images may not be required, and the training set may be generated from images of real users only.

Figure 5:
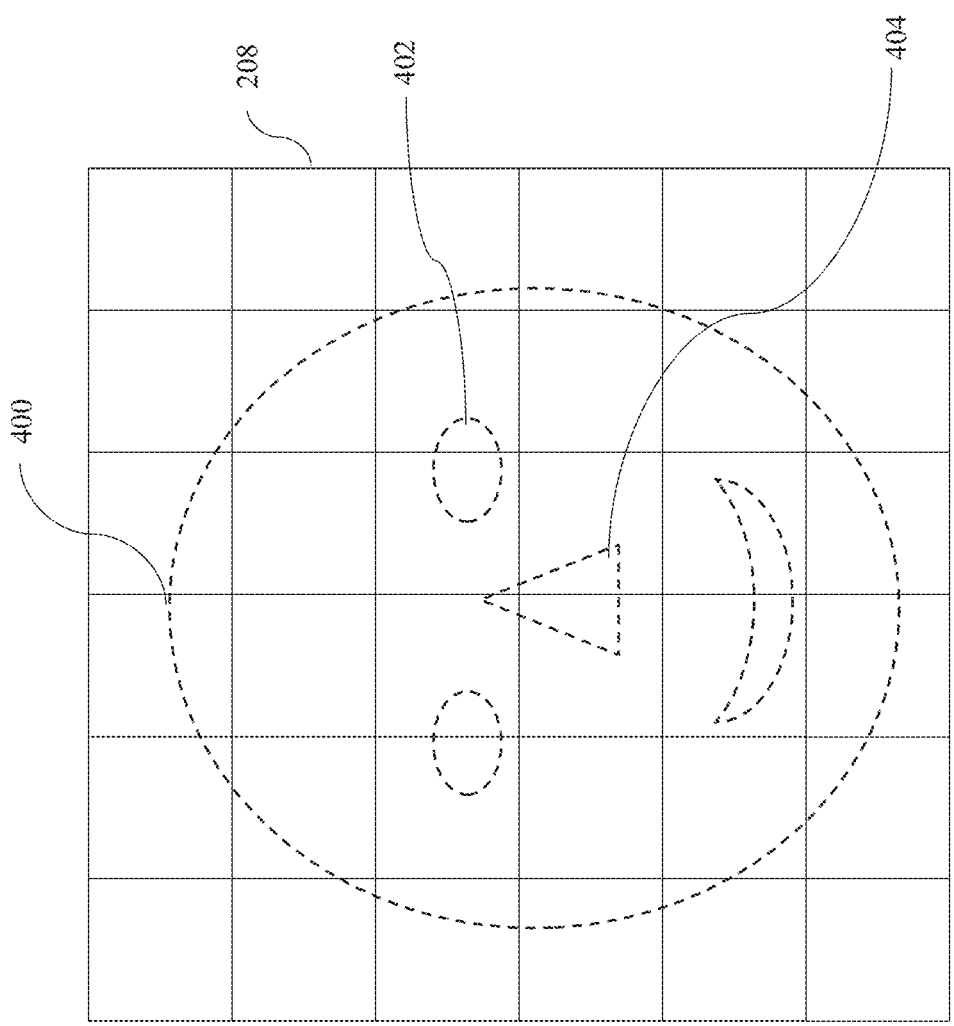
FIG. 5 shows an example of image depth data.

FIG. 5 shows an example of captured image depth data 208, with a face 400 overlain. The face 400 corresponds to the face of the human 200 or the spoofing entity 202 as captured by the 3D image capturing device 204. The image depth data 208 will be different in these two cases. For example, when image data for the human 200 is captured, the depth data associated with the eye 402 and the nose 404 will differ, since they are at different depths on the face of human 200. However, the depth data collected for the eye 402 and nose 404 of the spoofing entity 202 will not differ significantly since the spoofing entity 202 is a 2D image.

The image depth data 208 can be captured using any form of 3D image capture technology, such as stereoscopic image capture and processing, IR (infra-red) projection, time-of-flight, Lidar etc.

Figure 6:
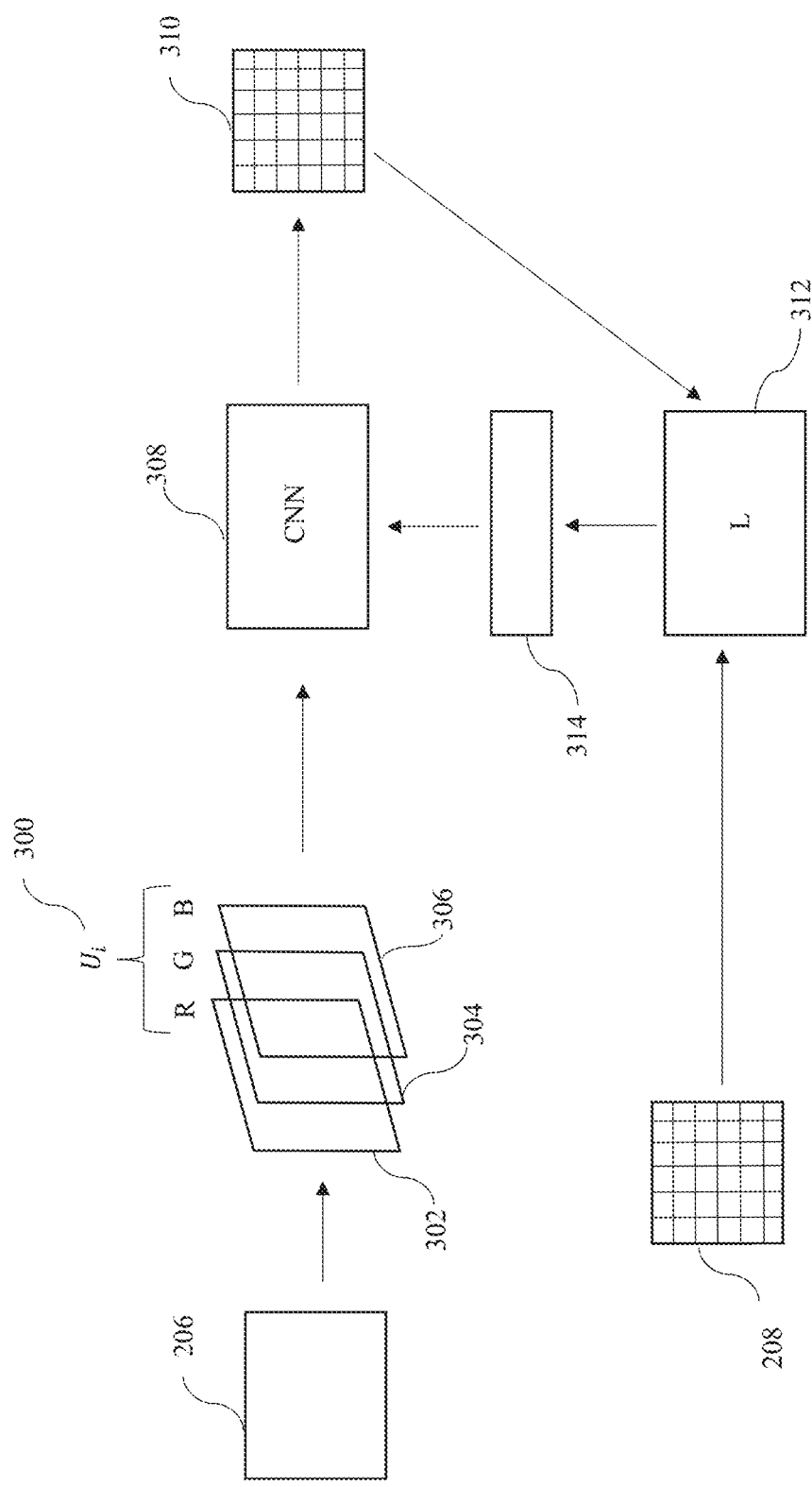
FIG. 6 shows how a Convolutional Neural Network (CNN) can be trained to predict the depth of pixels in a 2D image.

FIG. 6 shows a schematic of how the 3D image data can be used to train the image processing component 308. The 2D image 206 comprises three data representation 'layers': red 302 (R), green 304 (G), and blue 306 (B). These three layers make up a 3D input 'volume' (3D array) $U_i$ 300 with dimensions M×N×3, where M and N are the number of rows and columns respectively in a 2D matrix corresponding to each of the data representation layers 302, 304, 306 of the 2D image 206. As will be apparent, although represented as a 3D value, the image is still a 2D image as that term is used herein because it lacks explicit depth information. The depth layer D is not provided as an input to the image processing component 308, but rather is used as a ground-truth training label to which the output of the image processing component 308 is matched (see below).

The input value 300 is inputted into the image processing component 308. The image processing component 308 is used to process the image 206. The output of the image processing component 308 is a feature map 310 of size M×N.

The feature map 310 predicts the depth information of the input 2D image 206. This may be in in the form of depth predictions of each pixel, thus the depth of features captured in the 2D image 206. In other embodiments, the feature map 310 predicts depth information of areas of the captured image 206. For example, the feature map 310 may predict depth information for 'superpixels' within the captured 2D image 206, where a superpixel is a set of image pixels that have a similar colour and are spatially close to each other. In other embodiments, the feature map 310 may predict the relative depth information between different locations on the 2D facial image 206. It may, for example, predict the relative depths of arbitrary pixels or areas of the 2D image 206, or it may identify facial features in the image 206, such as the eye 402 and nose 404, and predict the relative depths of these features. Therefore, the feature map 310 is a prediction of the image depth data 208 captured by the 3D image capturing device 204 which can take various forms depending on the context.

The output of the image processing component 308 is the estimated depth of the input 2D image 206, as explained above. This estimated depth is a very useful 3D shape descriptor of the depicted face. There may be some instances in which non-uniform depth data is estimated for the input 2D image 206b generated of the spoofing entity 202. For example, if the spoofing entity 202 is tilted such that the top of the image is closer to the 3D image capturing device 204 than the bottom, the image depth data 208b will contain depth information which indicates that the depth of the spoofing entity 202 varies to match its positioning relative to the image capturing device 204. Thus, the image depth data 208b, and the corresponding feature map 310 of the spoofing entity 202 may still contain varying depth data, even though the spoofing entity 202 is a 2D image. However, the shape of the entity in the 3D space will be significantly different to that corresponding to the real human 200. The aim of the pre-training phase is to train the image processing component 308 to identify these differences.

No manual annotations are required for the input array 300. The image processing component 308 is used to predict the image depth data 208, so the image depth data 208 acts as the ground truth against which the output of the image processing component 308 is assessed.

The image processing component 308 is trained using a large number of training 2D images 206 and corresponding image depth data 208. A training dataset comprising a plurality of these pairs of image data is generated.

A pre-training loss function 312 is used to compare the feature map 310 and the image depth data 208. It is calculated as a function of the feature map 310 and the image depth data 208, and provides a measure of the difference between the feature map 310 and the image depth data 208 (which can be based on relative depth—see below). The loss function is used to tune the image processing parameters of the image processing component 308 to the depth extraction task. As the derivative of the loss function 312 with respect to the parameters approaches zero, the feature map 310 approaches the image depth data 208 collected.

A number of different 2D and 3D structures may be used to train the image processing component 308, and the 2D images 206a, 206b generated of the training subjects will contain different depth characteristics for the image processing component 308 to learn from. The difference between 2D images of real and spoofing entities 206a, 206b may only be subtle, but by exposing the image processing component 308 to a large number of examples, it can learn to infer depth features from even subtle differences in the different types of image. The subtle differences between the 2D images 206a and 206b may not be obvious, hence the use of the trained image processing component 308 is advantageous over simply defining a set of rules for the anti-spoofing module to implement when deciding if the entity is a real human 200 or a spoofing entity 202.

The aim of the training is to adjust the image processing parameters of the image processing component 308 in order to match the outputs 310 across the training examples to the corresponding image depth data 208. To achieve this, the loss function 312 is defined to provide a measure of difference between the outputs across the training dataset and the corresponding image depth data 208 in a given iteration of the training process. The loss function 312 may be defined such that it has a greater value for certain inaccuracies in the feature map 310. Differences between the training data and the output of a CNN result in penalties, with some types of differences resulting in larger penalties than others, as defined by the loss function. Back-propagation is then used by a back-propagation component 314 to adapt the model parameters for the next iteration with the objective of minimising the defined loss function 312 i.e. back-propagation aims to correct things the network has been penalised for. This process is repeated until defined stopping criteria are met. The stopping criteria are chosen to optimise the loss function 312 to a sufficient degree, whilst avoiding overfitting of the system 602 to the training set. Following successful training, the image processing component 308 is able to apply the knowledge it has gained in training to new inputs that it has not encountered during training. The principles of back-propagation based on loss functions are well known per se hence further details are only described herein to the extent that they are considered relevant in the present context. What is novel here is using 3D image data to train a ML processing component to infer the depth of features in a 2D image.

The loss function 312 may consider the absolute depth values predicted in the feature map 310. Alternatively, it may be concerned only with the relative depths predicted. For example, with reference to FIG. 5, the loss function 312 may only penalise the system if the pixels depicting the nose 404 are behind or at the same depth as those depicting the eye 402 for an image of actual human 200, since the nose 404 pixels should be in front of the eyes 402 when an actual human 200 is used as the entity for which an image is captured. In other embodiments, the absolute depths of each pixel in the feature map 310 may not be penalised by the loss function 312, but the pixels should be at depths which scale to the depths of the corresponding pixels in the depth image data 208.

Where the image processing component 308 is trained based on relative depth estimation, the pre-training loss function 312 may be a three-way problem involving a pair of locations A and B on the 2D images 206. There may be three different labels in this case: dA==dB when the two points have the same depth, dA<dB when point A is closer to the camera than point B, and dA>dB when A is further away from the camera than point B. These labels may be determined for the points A and B on both the 2D image 206 and the image depth data 208, and then compared using the pre-training loss function 312. It is expected that training based on relative depth may help to form the model on depth characteristics that are more relevant to anti-spoofing.

A number of specific examples of pre-training loss functions will now be described. It will be appreciated that these example loss functions are described for the purposes of illustration only and that other forms of pre-training loss function are viable.

Regression Approach

The pre-training phase can be implemented using a straightforward regression approach. In machine learning, regression refers to a class of models which capture relationships between a set of input variables and an output variable. In the context of a regression approach, the pre-training loss function 312 may be referred to as a regression loss. The regression loss 312 may be defined in terms of absolute depth or in terms of relative depth.

In the present context, the image processing CNN 308 is trained to perform regression to predict the depth map 310 (depth image), with the 2D image data 206 as input and the ground-truth depth map 208 encoding target variables. In this case, the input variables are the coordinates and values of the pixels in the 2D image 206 and each pixel of the output feature map 310 constituting an output variable with the regression loss 312, defined so as to penalise deviation from the corresponding pixel of the ground truth depth map 208 in training. The regression loss 312 is used to minimise the difference between the ground truth depth value and the predicted depth value of each pixel. The loss function for the image is the sum of the loss function for each pixel, and parameters of the network are updated to minimise the total loss function across the training set.

The regression approach may, for example use an "L1" or "L2" loss function in training. L1 loss is the sum of absolute distances from the predicted value of a target variable to the ground truth value across the training instance. L2 loss is the sum of square distances between the predicted and ground truth values. The desired effect of minimising these distances is to train a model that predicts a depth map close in to the "real" (absolute) depth of the scene captured by a 2D input image. The depth of both the ground truth and predicted maps may be normalised. The L1 and L2 loss functions are known per se, and are therefore not described in any further detail.

Ordinal Softmax Depth Loss Function

An alternative approach to predicting depth is to discretize the ground-truth depth map values into a reasonable number of labelled, ordered depth classes, and train a classifier to predict the data class for each pixel of a given 2D input image. The image processing component 308 would in this case produce a predicted depth map of depth class labels. Each class corresponds to a "bin", i.e. a range of depth values.

Typical multi-class classification methods do not account for any relative ordering of labels. For example, with a simple cross-entropy classification loss, if a pixel is classified into the wrong bin, the loss function for classification is the same irrespective of any concept of 'distance' between the predicted label and the ground truth label.

In the present context of depth estimation, this may be undesirable, and instead the loss function 312 may be defined within an "ordinal regression" framework. As described in 'Deep Ordinal Regression Network for Mononuclear Depth Estimation' (Fu et al., 2018), incorporated herein by reference in its entirety, ordinal regression can be implemented by defining a set of thresholds to separate each class, and training a set of binary classifiers, one for each threshold, that predict whether a given pixel falls above or below the threshold defining that classifier. The output of each classifier may be the probability $p^k$ that the pixel is above the threshold for a classifier k.

For a set of K classes, there will be K−1 thresholds and thus K−1 classifiers. If a ground truth pixel's value is below or equal to a threshold value, it may be assigned the classification value 0, and if its value is above a threshold, it may be assigned the classification value 1. A given pixel of the ground truth depth map could thus be represented as a vector of length K−1 (the number of thresholds), where the value of the $k^{th}$ entry is 0 if the pixel value is below or equal to the threshold for classifier k and 1 if it is above the threshold for classifier k.

The ordinal regression model may calculate a cross-entropy loss for each of the binary classifiers. For classifiers with thresholds equal to or above the correct label, the ground truth value for that classifier is 0 and the cross-entropy term is $\log(1-p^k)$. For classifiers with a threshold below the correct label, the ground truth value is 1 and the cross-entropy is $\log(p^k)$.

The resulting loss function 312 for a single pixel of the image is:

$$\sum_{k=0}^{l-1}\log(p^k) + \sum_{k=l}^{K-1}\log(1-p^k)$$

The parameters (weights) of the image processing CNN 308 can be adjusted with the goal of minimising the above loss function across all pixels of all images of the training set. This can be achieved using gradient methods to update the weights, computing the gradient of the loss function 312 with respect to the network weights via backpropagation as described above.

By way of example, FIG. 10 shows an example of ordinal regression applied with at least four depth bins 1002, using at least three threshold classifiers 1004 defined with respect to thresholds T1, T2 and T3 respectively which respectively define the boundaries between bin 1 and bin 2, bin 2 and bin 3, and bin 3 and bin 4. It will be appreciated that this is merely an example and the present ordinal regression techniques can be applied with different numbers of depth bins.

Figure 7:
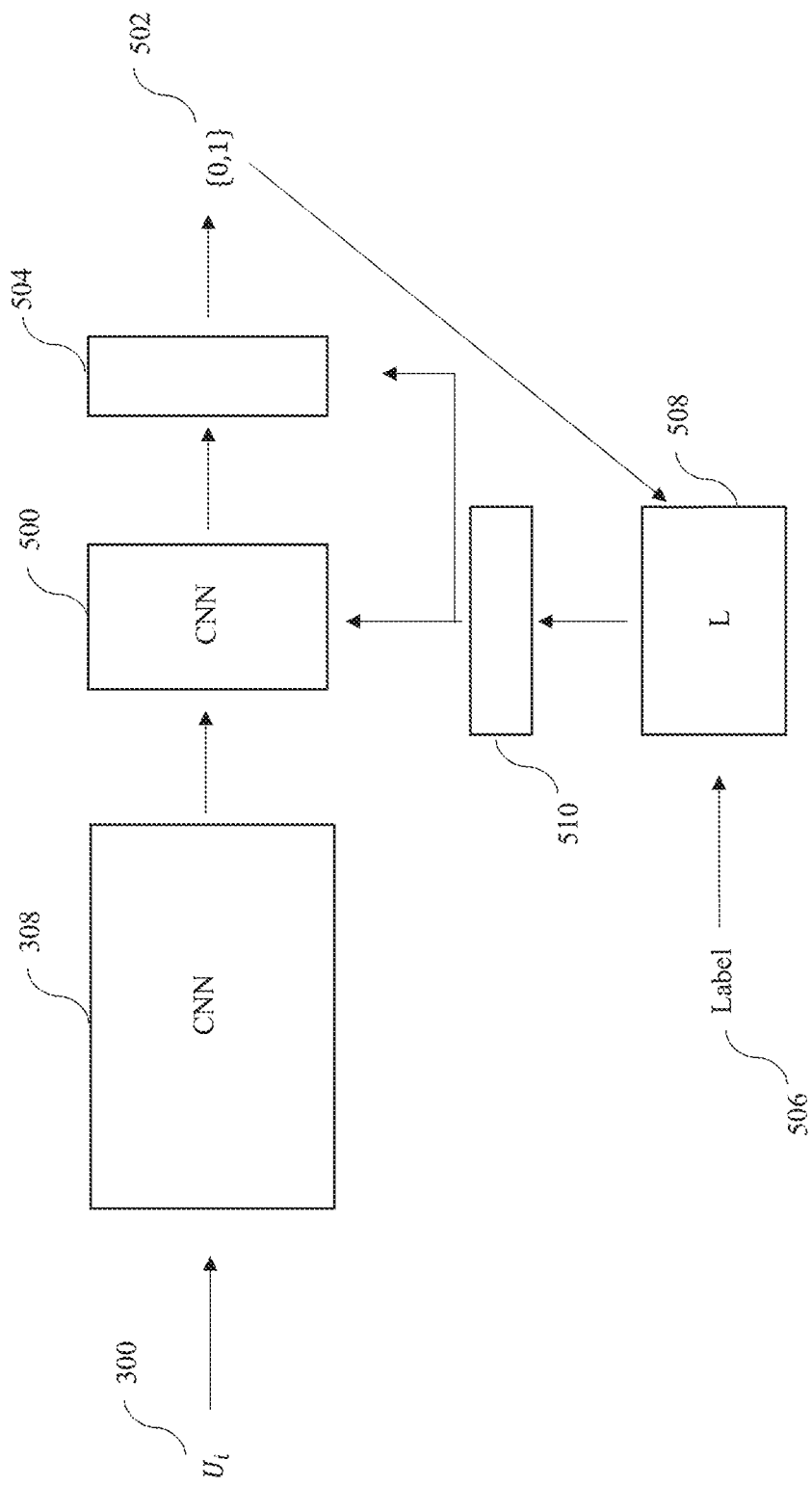
FIG. 7 shows how a classifier can be trained to classify a 2D image as that of an actual human or a spoofing entity.

Fine-Tuning Phase:

Fine-tuning of the neural network is shown in FIG. 7. Again, the 3D array 300 derived from the captured 2D image 206 is used as the input of the image processing component 308. The image processing component 308 may have had one or more of the final layers removed or all of the processing layers learned in pre-training may be retrained. Where the final layer(s) is removed, the classification is performed using an output of at least one "hidden" (intermediate) layer of the image processing component 308, i.e. a processing layer(s) before the removed final layer(s). In that case it is (intermediate) depth information extracted by the hidden layer(s) that is used as a basis for classification. The image processing component 308 passes its output to the feature processing component 500 which is used for feature refinement. The output of feature processing component 500 is passed to the anti-spoofing classifier 504, which is a fully connected softmax layer. This outputs a classification output 502 which classifies the input array 300 as either a human or a spoofing entity (or, more generally, in relation to at least 'real' and 'spoofing' classes).

The training data used in this stage of the training process may be the same as the data used to train the image processing component 308. Alternatively, a different dataset may be used. If a different dataset is used, only 2D images 206 are required, so a 2D image capturing device could be used to collect the data, but both real humans 200 and spoofing entities 202 need to be captured so that the anti-spoofing classifier 500 can be trained to identify both.

The training data is labelled with label 506. This is the ground truth anti-spoofing classification. The label 506 labels the input array 300 as either an image of an actual human 200 or of a spoofing entity 202. Thus, the label 506 is also a binary value. The labels 506 of the input arrays 300 in the training dataset are applied manually, but it is relatively easy for a human to apply these as they are straightforward classifying classes. The number of training images in the training dataset used for fine-tuning may be much smaller than the number required for pre-training of the image processing component 308.

The depth information inferred by the image processing component 308 of features captured in the 2D image 206a, 206b can be used by the anti-spoofing classifier 504 to determine if the entity in the captured image is a real human 200 or a spoofing entity 202.

The feature processing component 500 contains convolutional and fully connected layers whose parameters will be learned at the fine-tuning phase. These layers will learn to extract an even better 3D shape representation than that extracted by the image processing component 308 from the estimated depth as predicted by the image processing component 308. The prediction of the feature processing component 500 is then passed to the anti-spoofing classifier 504 for distinguishing between real and spoofing samples.

To train the feature processing component 500 and the anti-spoofing classifier 504, a fine-tuning loss function 508 is used. This is a different loss function used to that used to train the image processing component 308. The fine-tuning loss function 508 is a function of the classification output 502 and the label 506 of the training data, and is a measure of the difference between the label 506 and the classification output 502.

Back-propagation is then used by a back-propagation component 510 to adapt the feature processing parameters of the feature processing component 500 and the classification parameters of the classification component 504 for the next iteration with the objective of minimising the defined fine-tuning loss function 508. This process is repeated until defined stopping criteria are met. The stopping criteria are chosen to optimise the fine-tuning loss function 508 to a sufficient degree, whilst avoiding overfitting of the system 602 to the training set. The weights of the image processing component 308 are frozen during pre-training. Alternatively, rather than completely freezing the weights, small updates to those parameters may be permitted based on the classification error.

Following successful training, the feature processing component 500 and anti-spoofing classifier 504 are able to apply the knowledge it they have gained in training to new inputs that the neural network has not encountered during training.

Figure 8:
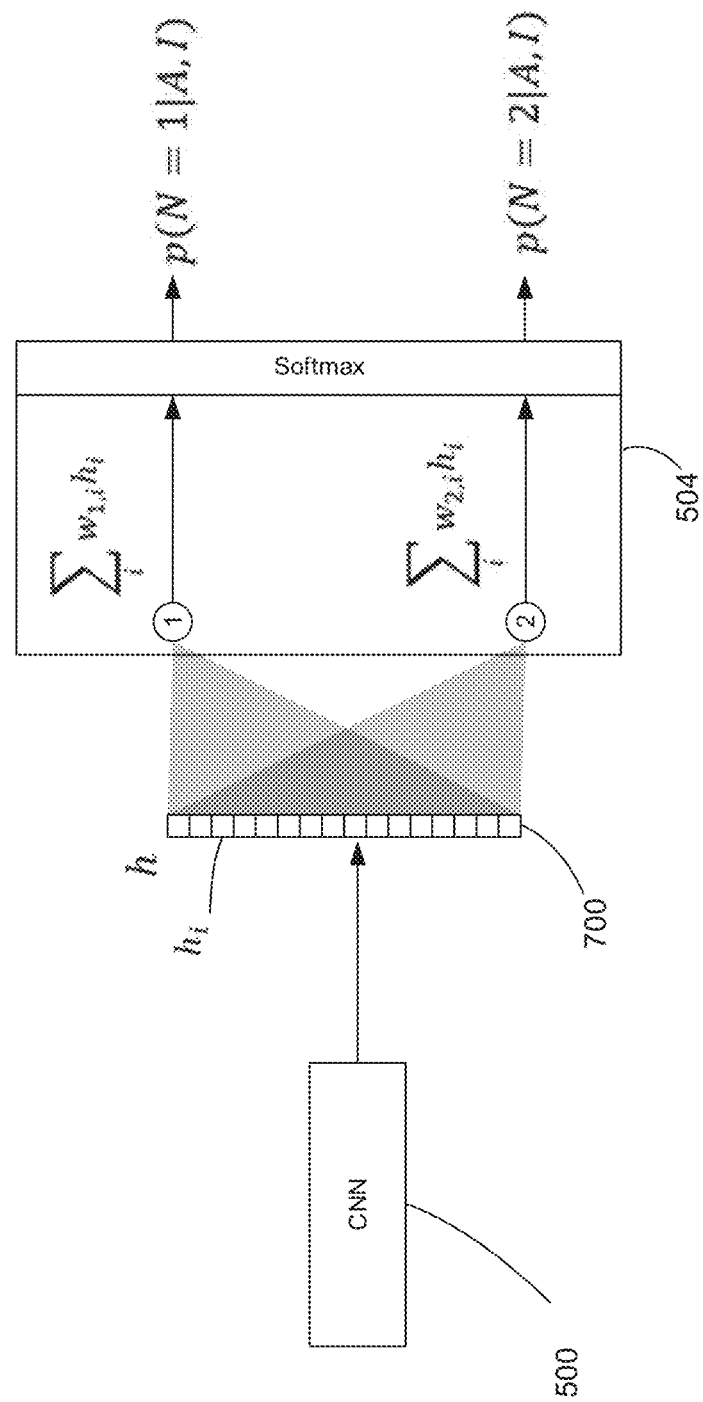
FIG. 8 shows a functional block diagram of an anti-spoofing classifier.

FIG. 8 shows further details of the anti-spoofing classifier 504 in one example. Two classes are shown which correspond to spoofing and human classes. In the example of FIG. 8, the anti-spoofing classifier 504 takes the form of a "fully connected" neural network processing layer comprising two neurons (nodes) which are represented as circles numbered 1 and 2. The anti-spoofing classifier 504 is shown to comprise a fully connected layer with a softmax activation. Each of the nodes 1 and 2 operates directly on the feature refinement vector 700, the output of feature processing component 500, which is represented using mathematical notation as h, and computes a weighted sum of the components of h:

$$\sum_i w_{n,i} h_i$$

The set of weights $w_{n,i}$ used by node n (corresponding to age class n) are learned during training so as to weight the corresponding features $h_i$ according to their relevance to the anti-spoofing class in question. The weights across the two neurons constitute the classification parameters of the anti-spoofing classifier 504 in the present example. Softmax normalisation is then applied across the outputs of the neurons 1 and 2 in order to compute normalised class probabilities for each of those classes. The processing layer is fully connected in that the weighted sum computed by each node n is defined over the entire refined feature vector 700, and based on a set of weights $\{w_{n,i}\}$ unique to that node n, which emphasise features most relevant to anti-spoofing class n. For example, n=1 may correspond to real humans and n=2 to spoofing entities.

Although FIG. 8 shows only a single fully-connected layer, the anti-spoofing classifier 504 can have a more complex structure. For example, it may comprise multiple fully-connected layers at which one or more intermediate non-linear processing operations are performed (before the final softmax normalization).

Controlled Illumination

In some embodiments, the user device 102 may control the lighting of the entity by using, for example, the display or the camera flash. It may, for example, produce a colour or flash(es) of light and detect the effects on the entity. It is expected that the anti-spoofing module 602 may then detect the effects of the light on the entity in the captured image 600. It may detect shadows or glare for example on the entity, for example detecting for unexpected shadows produced by lighting in an environment in which a photograph was taken, or unexpected glare due to lights on a reflective surface such as a screen or photographic paper. However, ultimately the image processing component 308 makes its own 'decision' about which features to detect based on the examples it encounters in training.

In order for the anti-spoofing module 602 to be able to use such information to determine if the entity is real or spoofing, the image processing component 308 must be trained using training data which includes images 206a, 206b of both real humans 200 and spoofing entities 202 which have different lighting effects applied to them. The image processing component 308 can be trained using this dataset as described above.

Data Processing

FIG. 9 shows a schematic block diagram that demonstrates some of the principles of data processing within a CNN. Such data processing is applied in the image and feature processing components 308 and 500.

A CNN is formed of processing layers and the inputs to and outputs of the processing layers of a CNN are referred to as volumes. Each volume is effectively formed of a stack of two-dimensional arrays each of which may be referred to as a "feature map".

By way of example FIG. 9 shows a sequence of five such volumes 902, 904, 906, 908 and 910 that may for example be generated through a series of convolution operations and non-linear transformations, and potentially other operations such as pooling, as is known in the art. For reference, two feature maps within the first volume 902 are labelled 902a and 902b respectively, and two feature maps within the fifth volume 910 are labelled 910a and 910b respectively. Herein (x, y) coordinates refer to locations within a feature map or image as applicable. The z dimension corresponds to the "depth" of the feature map with the applicable volume. A color image (e.g. RGB) may be represented as an input volume of depth of three corresponding to the three color channels, i.e. the value at (x, y, z) is the value of color channel z at location (x, y). A volume generated at a processing layer within a CNN has a depth corresponding to a number of "filters" applied at that layer, where each filter corresponds to a particular feature the CNN learns to recognize.

A CNN differs from a classical neural network architecture in that it has processing layers that are not fully connected. Rather, processing layers are provided that are only partially connected to other processing layer(s). In particular, each node in a convolution layer is connected to only a localized 3D region of the processing layer(s) from which it receives inputs and over which that node performs a convolution with respect to a filter. The nodes to which that node is particularly connected are said to be within a "receptive field" of that filter. The filter is defined by a set of filter weights and the convolution at each node is a weighted sum (weighted according to the filter weights) of the outputs of the nodes within the receptive field of the filter. The localized partial connections from one layer to the next respect (x, y) positions of values within their respective volumes, such that (x, y) position information is at least to some extent preserved within the CNN as data passes through the network. By way of example, FIG. 9 shows receptive fields 912, 914, 916 and 918 at example locations within the volumes 912, 914, 916 and 918 respectively. The values within the receptive field are convolved with the applicable filter in order to generate a value in the relevant location in the next output volume.

Each feature map is determined by convolving a given filter over an input volume. The depth of each convolution layer is thus equal to the number of filters applied at that layer. The input volume itself can have any depth, including one. For example, a colour image 600 may be provided to the image processing component 308 as an input volume of depth three (i.e. as a stack of three 2D arrays, one for each color channel); the input volume provided to the feature processing component 500 may be a feature map of depth one, i.e. a single 2D array of the inferred pixel depths as found by the image processing component 308.

Using an image as an example, when a convolution is applied to the image directly, each filter operates as a low-level structure detector, in that "activations" (i.e. relatively large output values) occur when certain structure is formed by the pixels within the filter's receptive field (that is, structure which matches a particular filter). However, when convolution is applied to a volume that is itself the result of convolution earlier in the network, each convolution is performed across a set of feature maps for different features, therefore activations further into the network occur when particular combinations of lower level features are present within the receptive field. Thus, with each successive convolution, the network is detecting the presence of increasingly high level structural features corresponding to particular combinations of features from the previous convolution. Hence, in the early layers the network is effectively performing lower level structure detection but gradually moves towards higher level semantic understanding of structure in the deeper layers. These are, in general terms, the broad principles according to which the image processing component 308 learns to extract relevant depth characteristics from image data, and by which the feature processing component 500 refines these features where applicable.

The filter weights are learned during training, which is how the network learns what structure to look for. As is known in the art, convolution can be used in conjunction with other operations. For example, pooling (a form of dimensionality reduction) and non-linear transformations (such as ReLu, softmax, sigmoid etc.) are typical operations that are used in conjunction with convolution within a CNN.

As processing occurs in a CNN, generally (x, y) dimensionality reduction will occur. However, the feature processing component 500 needs to provides an output whose dimensionality matches the depth map D to which it is compared. Therefore, the image processing component 308 includes one or more layers for upsampling. This allows for image segmentation, in which every pixel of the image has a label associated with it. The output if the image processing component 308 thus is a feature map 310 of size M×N, which is the same height and width as the depth map D.

The principles of upsampling in CNNs are known for example from existing segmentation networks, and are therefore not described herein in any further detail.

Global Versus Local Perception

With the CNN architecture and training described above, the image processing component 308 will take a "global" approach to the estimation of depth that is used for the purpose of the subsequent anti-spoofing classification. Typically, a combination of filtering and down-sampling will be applied at successive layers within the image processing CNN 308 and/or the feature processing component 500 such that structure within increasingly large areas of the original image 206 will be taken into account. Moreover, the classification result provided by the classifier 504 is a global classification of the image 600 as a whole. For ease of readability, the image processing component 308 may be referred to in the following description as the global depth estimator 308, and the classifier 504 may be referred to as a global anti-spoofing classifier.

FIG. 12 shows the image processing CNN 308 to have an "hourglass shape". Although highly schematic, this represents the general concept that, in the initial layers of the image processing CNN 308, the perceptive field over which each filter is defined corresponds to increasingly large areas of the original training image 206. In the later layers of the image processing CNN 308, some form of up-sampling is applied to ultimately bring the dimensionality of the feature map 310 up to match that of the ground truth depth map 208 in FIG. 6. The feature processing component 500 may also use relatively large perceptive fields and/or some form of down sampling to achieve a global perspective. This is beneficial as it allows more global information within the original 2D training image 206 (e.g. 206a and 206b) to be taken into account by the image processing CNN 308 for the purpose of estimating the depth values across the image 206.

In order to augment this global perspective, as shown at the bottom half of FIG. 12 at least one localised 'patch-based' image processing component may be provided, which operates in conjunction with the image processing component 308 to provide a more localised analysis of the 2D training image 206. Two such patch-based image processing components are shown in FIG. 12, denoted by reference numerals 1100a and 1100b respectively, each of which feeds into a respective patch-based anti-spoofing classifier 1102a, 1102b. The first patch-based image-processing component and classifier 1100a, 1102a constitute a first patch-based anti-spoofing component, and the second patch-based image-processing component and classifier 1100b, 1102b constitute a second patch-based anti-spoofing component. Each patch-based anti-spoofing component operates independently but with broadly the same architecture. That architecture is described below with reference to FIG. 11, which shows a patch-based image processing component 1100 (e.g. 1100a or 1100b) coupled to a patch-based anti-spoofing classifier (e.g. 1100b or 1102b).

The purpose of the localised image processing component 1100 at inference is to separately classify individual patches within the original 2D image 600 in relation to a set of classes that is useful in the context of anti-spoofing. These may be the same as or different than the anti-spoofing classes over which the outputs of the global classifier 500 are defined (e.g. both bay use the same simple binary scheme consisting of a single "real" class and a single "spoofing" class, or one or both may use more complex multi-class schemes, e.g. with multiple spoofing classes for different types of attack). In the first example described below, the localised image processing component 1100 is configured to classify each of a plurality of image patches in relation to real/spoofing classes. What this means in practice, is that, once the localised image processing component 1100 has been trained, and a 2D image is provided to it at inference, it may be that some patches within that image are classified as real whereas other patches within the same image are classified as not real, i.e. spoofing. Although, ultimately, an image will either be of a real person or a spoofing entity, giving the localised image processing component 1100 the flexibility to assign different real/spoofing classification values to different patches within the image takes into account the fact that certain regions within the image may be highly similar or indistinguishable between real and spoofing images, and that the differences between real and spoofing images may only be readily identifiable in certain other regions within the image 600.

An issue that can arise when training the global anti-spoofing classifier 504 and the feature processing component 500, in the fine-tuning phase, is that the system may start to rely on identity of users for classification—a form of overfitting. This can be overcome by including examples of both real and spoofing images for the same users (i.e. for each of those users, both a real image of that user and a spoofed image of that user is included). However, this does impose some restriction on the training set.

A focus on local patches prevents the model from relying on the identity of either the real person or the person in the spoof image to classify the attempt. This relaxes the requirement of having both genuine and spoof training samples from the same individuals in the training dataset, meaning greater flexibility for curating the training set.

Multiple patch-based image processing components of this nature may be provided and trained to detect different types of spoofing attacks. For example, a first such component could be trained to detect a "mask attack" in which a user prints a face of another user onto a piece of paper, and forms a cut out in the region of the nose. The user can then use this as a simple mask, with his or her own nose protruding through the cut out. When an image is captured of the user with the mask, the region in which the user's real nose is captured will, at a local level at least, be indistinguishable from a non-spoofing image because what is captured in the image is a real 3D human nose. However, other facial structure within the image will generally appear significantly less realistic, in particular the region of more complex facial structure around the eyes which is much harder to spoof.

A second patch-based component may be trained to detect other spoofing attempts such as photograph (print) and video (replay) attacks, focusing on colour distortion and local texture features to detect a spoofing attempt. A system that combines both of the above-mentioned cases with a global anti-spoofing component is described below and shown in FIG. 12.

The combination of a global perspective on depth provided by the global depth extractor 308 together with the localised interpretation by the localised image processing component 1100 provides an effective way of detecting mask attacks and other similar attacks. In the case of a mask attack, it may be expected that the localised image component will classify image patches of the image 600 around the nose as real but will classify other image patches around the eyes as spoofing. Together with an indication in the estimated depth map that the region around the eyes does not exhibit the expected 3D structure of the region around the eyes, those two pieces of information provide compelling evidence that the image in question is a spoofing image and not that of an actual human face presented to the camera.

The localised image processing component 1100 can be implemented with a "patch based CNN architecture", as will now be described.

Patch-Based Anti-Spoofing Network

A highly schematic representation of a patch-based image processing component 1100 is shown in FIG. 11. A 2D image 600 is passed as input to the localised image processing component 1100, comprising a CNN. The output volume, a stack of 2D arrays, of the localised image processing component, is then passed to a patch-based classifier 1102 which is trained to detect local texture and colour features that may be indicators of spoof videos or photographs and output a set of classification values for each of a set of image patches extracted by the CNN, where example image patches 1106 and 1108 of the input image 600 are shown in FIG. 11. Note, the patch-based classifier 1102 does not classify the image as a whole, but rather classifies each image patch individually. The patch-based classifier 1102 may take the form of a final convolutional layer. The classification value represents the likelihood of the patch belonging to a 'real' or 'spoofing' image. These classification values can be combined over all patches to output a classification value for the entire image. The CNN 1100 and the patch-based classifier 1102 constitute a localized anti-spoofing component, and may be trained simultaneously in an end-to-end fashion.

For print and replay attack detection, the localized anti-spoofing component is trained on images of live humans, as well as spoofing entities, including print photographs and videos, generated by a 2D image capturing device. The input volume is the 3D array 300 obtained from the captured 2D image 206 shown in FIG. 6.

For mask attack detection, this component is trained specifically on images of mask and cut-out attacks, which are described earlier. In this case, the architecture remains identical, but the training data consists of examples of mask and cut out attacks and real humans.

FIG. 12 shows a system with two such localized image processing components 1100a and 1100b, where the components 1100a and 1100b trained on mask attacks and print/replay attacks, respectively. Similarly, components 1102a and 1102b are patch-based classifiers trained on mask attacks and print/replay attacks, respectively.

The patch-based image processing component 1100 in FIG. 11 is a CNN comprising multiple convolutional layers, each of which consists of a stack of two-dimensional arrays. FIG. 9a shows a high level overview of data processing by a shallow CNN. As described earlier, the input at each layer of a CNN consists of 'volumes', i.e. stacks of 2D arrays. The input volume 902 may have a stack of depth 3 representing each of the colour channels R, G, B. Subsequent volumes 904, 906, have stack depth dependent on the number of filters applied at the previous convolutional layer. FIG. 9a shows a high-level example of a CNN which consists of a small number of layers and thus learns a low-level representation of the input images with a focus on basic structural elements. It will be appreciated that the patch anti-spoofing network may consist of a different number of layers than what is illustrated in FIG. 9a.

The receptive fields 912, 914 in this network are small relative to the image size, in order to detect low-level structures within images. The filters also have a small stride length of e.g. 2, meaning that each input patch is shifted by 2 pixels compared with the nearest patch in any direction. The resulting convolution, or any non-linear transformation that may be applied to the convolution, is large for a given filter if the structure in its receptive field matches the structure the filter has been trained to detect. The CNN may utilise padding to control the size of output arrays.

As shown in FIG. 12, after being processed by CNNs 1100a and 1100b, classification functions 1102a and 1102b are applied to the respective output volumes to map them to 2-dimensional arrays of classification values, each representing the likelihood of the corresponding patch of the input image belonging to a real human rather than a mask attack or a spoof image.

The output of these classifiers may be combined with the output of the global anti-spoofing classifier 504 in a combined classification component 1104 to predict a binary label of 'spoof' or 'real' for the input image, considering both global, local and mask-specific features. This final anti-spoofing result is a binary decision, which determines whether or not to grant access to the restricted function 606. This final decision takes into account both the global information from the global classifier 500, but also the localized information from the patch-based classifier(s) 1102 (1102a and/or 1102b).

As an alternative to the architecture of FIG. 12, a single patch-based anti-spoofing component could be trained to perform multi-classification, with at least three classes, e.g. real, cut-out/mask attack and replay/print attack (the latter two being, conceptually, sub-classes of the broader spoofing class, corresponding to specific types of spoofing attack).

Anti-Spoofing Heatmap

Each value output by the CNN 1100 may be traced back through the network as shown in FIG. 9a, where a value of one array of the final output layer 916a is mapped to a receptive field 912 of the original input volume 902. This allows mapping of final classification values back to patches of the original image. However, these patches are overlapping which makes it difficult to interpret which local features contribute most to the classification output. The array of classification values may instead be converted to a heatmap of scores, wherein each bin of the heatmap corresponds to a distinct subset of pixels in the input image 600. The patches and their overlap is defined by the side of the image 600 and the configuration of the convolutional layers—including the perceptive field and stride applied at each filtering layer.

FIG. 13 shows an example of a heatmap 1300 overlaid on an input image, with a heatmap pixel 1302 highlighted. A pixel of the heatmap does not necessarily correspond with a single image pixel. A heat map pixel could be a 'superpixel' corresponding to a region of multiple pixels in the input image. Each individual pixel within the same superpixel is assigned the same classification value (anti-spoofing score). The size of a superpixel may be determined by the stride of the convolutional filters, such that a larger stride at each convolutional layer corresponds to a larger region of the input image represented by each pixel of the heatmap.

The score $S_p$ for each pixel p of the heatmap may be computed as an average of the scores of each patch m in the input image to which the pixel p belongs:

$$S_p = \frac{\sum_{m \in M_p} S_m}{|M_p|}$$

where $M_p$ is the subset of image patches to which the pixel p belongs, $m \in M_p$ is a patch in $M_p$ and $S_m$ is the anti-spoofing score assigned to patch m.

The resulting heatmap may or may not be used for detecting spoof attacks. The heatmap highlights areas of the input image 600 that signal a particularly high probability that the image is a spoof, for example, as described earlier, the areas around the eyes may be particularly indicative of a mask attack. This format is helpful for a human analyst to interpret the areas of focus for the network, where scores for overlapping patches are less representative of individual facial features. Heatmaps may be used to identify overfitting of the training data, as the network may learn specific facial features of positive training images and apply these rules in testing even though the given feature may not relate to the spoofing attempt.

Multi-Frame Depth Estimation

As described above, the anti-spoofing module 602 may also be configured to process a multi-frame verification image (video image, formed of a sequence of still/static frame images). In this case, the image processing component 308 may be trained to predict a depth map for a multi-frame image input 600.

A multi-frame verification image 600 can be encoded as an input tensor, in which the multiple RGB frames are "stacked", e.g. with three colour channels (e.g. RGB), a tensor having dimensions of at least M×N×3W where M×N are the pixel dimensions of each RGB frame and W is the number of RGB frames (with 3 colour channels per frame in this example).

The N frames of the input tensor could be a subset of frames selected from a longer video sequence. With a multi-frame input 600, a single image frame of the input image 600 may be selected as a "primary" image frame on which the depth map is to be predicted, where the other frames of the selected window may be selected to provide additional features to improve the depth estimation. Frames may, for example, be selected based on a time window spanning a section of a video in which the image capture device begins pointing at the user's chin from below, and moves upwards until the image shows a view of the users face from above. In this case the 'primary' input frame may be taken from the middle of the captured frames, where the image capture device is approximately level with the face. The prediction task may be formulated as determining a depth map for this primary image frame, given this and a set of adjacent image frame(s) as context. Single-frame prediction is thus equivalent to multi-frame prediction where the sliding window is reduced to a single frame.

For example, in the case of facial images, a face pose vector in each of the 2D image may be estimated, e.g. using facial landmarks, in order to identify one of the frames as having a desired pose (e.g. the user looking more or less directly at the camera). The input tensor can then be formed by taking the primary frame, and a selection of adjacent or nearby frames. An example of a suitable face pose estimation algorithm for 2D RGB frames using facial landmarks is disclosed in in U.S. patent Ser. No. 10/546,183, which is incorporated herein by reference in its entirety.

More generally, an estimated face pose from one or more frames can be used to select frames for the input tensor, e.g. selecting a subset of frames which most closely match a set of desired face poses. Such frame selection is a form of pre-processing, with the aim of providing more consistent inputs to the CNN 308.

However, such frame selection is not essential—with sufficient training data capturing a sufficient range of examples from which the CNN 308 can learn, the multi-frame techniques can be implemented without such pre-processing or frame selection.

Multi-Frame—Training Data Collection

FIG. 14A shows the 3D image capturing device 204 generating 2D multi-frame image data 206*a* and corresponding multi-frame image depth data 208*a* when capturing image data of actual human 200.

FIG. 14B shows the 3D image capturing device 204 generating 2D multi-frame image data 206*b* and corresponding multi-frame image depth data 208*b* when capturing image data of spoofing entity 202. If, for example, the spoofing entity 202 is a video of the actual human 200, the 2D image data 206*a*, 206*b* generated by the 3D image capturing device 204 may exhibit relatively subtle differences. However, the image depth data collected 208*a*, 208*b* will vary significantly between the two sources.

In this example, the captured depth data takes the form of a time sequence of depth images (one per frame). However, it can take other forms, such as a sequence of point clouds captured simultaneously with the images.

The data collection of FIG. 14B is specific to anti-spoofing. For other applications, such images may not be required, and the training set may be generated from images of real users only.

In order to capture useful visual motion features across the RGB frames (i.e. useful clues about feature depth that the CNN 308 can learn to recognize in training), the image capturing device 204 may be moved relative to the face of the user 200/the spoofing entity 202 when the image sequences 208*a*, 208*b* are captured. Alternatively or additionally, the user's face/spoofing entity 202 may be moved relative to the image capturing device 204.

FIG. 15 shows an example of an image capture process in which a user of an image capture device 204 moves the device while capturing a multi-frame training image 206. As indicated by the arrows in FIG. 15, the user moves the device upwards while capturing the video. This provides a series of image frames 206 from slightly different angles, with the user's face appearing lower in the image the higher the device 102 is raised, as shown by the downward arrow in the resulting image frames 206. This provides multiple views of the face with a corresponding series of depth maps. In order to provide a useful range of angles of the face from which to predict an accurate depth map, the device may be moved relative to the face so as to capture the desired range of facial angles.

In a possible further extension, motion data 212*a*, 212*b* (FIGS. 14A and 14B) is captured simultaneously with the video images 206a, 206b. In this case, it is generally preferable that the user's face/the spoofing entity 202 remains essentially still and that only the device is moved whilst the image sequences 208a, 206b are captured, to ensure correspondence between the motion data 212a, 212b and the motion that is visible in the corresponding image sequence 212a, 212b. The captured motion data 212a, 212b has various possible uses, as described later.

In order to provide high-quality ground truth depth maps for training on multi-frame inputs, the multi-frame depth information 208 scanned from the 3D image capture device 204 may be pre-processed to obtain a normalised 'canonical' depth map of the captured entity, such as a normalized, canonical face model for the entity. For example, if a short video is captured in which the device 204 is moved up or down during the capturing of the video as depicted in FIG. 15, a series of image frames will show the face from a range of angles, with some frames capturing features that are usually occluded in a front-facing view, for example the bottom of the chin. The depth information may similarly be captured throughout the video, providing multiple depth maps, measuring the depth of the user's facial features from a variety of angles. To determine a canonical ground truth depth map, in which the orientation, size, or other features of the face are standardised, a pre-processing aggregation step may be carried out on the captured depth data 208 corresponding to a given set of input frames 206.

FIG. 16 shows the generation of a "canonical 3D face model", in the form of a normalized, canonical ground-truth depth map 210 from a sequence of depth images 208. As described below, the canonical ground-truth depth map 210 is then used as ground truth in training, for the corresponding multi-frame RGB training input 206 (e.g. 206a or 206b). Once trained, the CNN 308 can the predict a canonical 3D depth map for a given multi-frame RGB input image at inference. In order to generate the ground truth canonical depth map 210, the set of captured depth maps 208 are input to a modelling component 800, which uses the information from the set of depth map frames to determine the ground truth canonical depth map 210. For example, the collected depth maps 208b may be aggregated using appropriate aggregation methods to obtain a combined face map.

As shown in FIG. 16, the modelling component may use device motion training data 212 captured by a motion sensor(s) coupled to the image capture device 204 to compensate for device motion when generating the canonical 3D face model. When collecting training data, the user may be instructed to keep their face still and only move the device during the capture of the video. In this case, changes to the face orientation and scale in the captured depth data can be identified with the motion data of the device, which may be useful in building a 'canonical' face model. In this case, changes in the pose of the image capture device 204 and/or changes in its distance from the user's face captured in the sensor data can be used to transform the depth data as necessary to the same pose and scale.

One possible aggregation method to aggregate depth maps 208 to form a canonical 3D model uses landmark detection. Landmark detection may be used to locate reference points of the face within the 2D RGB images 206. Landmark detection is described in further detail in U.S. patent Ser. No. 10/546,183, which is incorporated herein by reference in its entirety. Each 2D RGB image frame in the training data has a direct mapping to a corresponding depth map 208, which may be in the form of a depth image or 3D point cloud as described above. Landmark points can thus be mapped from the RGB images to the depth map 208 to determine a set of landmark points for the 3D depth map. For example, 3D point clouds corresponding to each RGB frame may be annotated with landmark point determined for the RBG image and combined into a single 3D point cloud model of the face, using the landmark points as a reference to match the point clouds of the different frames.

Another possibility is to aggregate the depth maps directly. Where the 3D depth map 208 comprises depth images, with a depth value for each pixel, the depth pixels of different image frames may be 'stitched together' by identifying matching pixels in different frames using a measure of temporal similarity. Depth pixels corresponding to the same area of the face in different frames are thus grouped together to align the depth maps of different frames into a single standardised depth image of the face.

Another possible aggregation method may transform the depth data 208 into a set of 3D points, and identify transformations to align the depth measurements for different frames, so that a single aggregate point cloud may be determined in line with the required 'canonical' face model. In this case, the modelling component 800 may, for example, use an Iterative Closest Point algorithm or some similar feature-based aggregation algorithm to determine a transformation mapping consecutive depth clouds to each other.

The purpose of the modelling component 800 is to compensate for motion across the frames, in order to provide a single ground truth, motion-compensated 3D model of the user's face (or other body part). Preferably, this is an aggregate 3D model, generated by aggregating depth data captured at multiple time instances (at different distances and/or orientations from the body part), compensating for motion of the image capture device 204 and/or the body part. The aim is to train the network to then infer such 3D models from a multi-frame RGB input.

The depth map 210 is one form of 3D canonical body part model that shows a human body part (e.g. face) at a single pose and scale. The depth map 210 is 3D in the sense that it encodes pixel depth values for the body part at that scale and pose, aggregating captured depth data from multiple frames. However, other forms of 3D model can be generated by aggregating a time sequence of depth data, such as mesh models, aggregate point clouds etc. Methods for aggregating depth data captured at different time instants are known per se, and it will be appreciated that the above examples are illustrative but not exhaustive.

FIG. 17A shows a schematic diagram of how the multi-frame 3D captured data may be used to train the image processing component 308. For a multi-frame training input 206, the image processing component 308 produces a single estimated depth map prediction 310 or, more generally, a single predicted 3D canonical body part model. As described above with reference to FIG. 16, a modelling component takes the multi-frame depth data 208 and aggregates the frames to generate a canonical ground-truth depth map 210 to train the image processing component.

FIG. 17A shows an input video 206, each frame comprising a 2D RGB image, with the pixels of each frame split into its respective red, green and blue channels. The input to the image processing component is a tensor of dimension M×N×3×W, where W is the number of frames of the input video 206, each having 3 colour channels in this example.

The parameters of the image processing component 308 are updated so as to optimise a loss function 312 which compares the ground-truth canonical depth map 210 with the single-frame depth map output of the image processing component 310. Examples of suitable loss functions 312 are described earlier. The image processing component 308 is trained to predict a single static depth image for a given input video. However, multiple estimated depth maps may be determined by sliding the window of the input video 206 along the frames of the image.

Once the image processing component 308 is trained according to a loss function 312 such as those described above, it can be used for inference to generate estimated depth data to be used in a fine-tuning phase. As described above for the collection of training images, the user device 102 may be moved relative to the user's face during the video capture. This may be done based on instructions from the user interface of the user device 102. The user interface may instruct the user to move the device in specific ways, or alternatively, the user may be instructed to move the device in any way they choose.

FIG. 17B shows the use of the image processing component in inference. In inference, depth maps are predicted for users 100 of a user device 102 which does not use 3D image capture equipment to measure depth. 2D videos are captured by the user device 102. The trained image processing component 308 takes the input of the RGB verification video 600, and outputs a predicted depth image 710.

Device Motion Data

Many user devices are equipped with inertial sensors such as gyroscopes, accelerometers, etc. Device motion data 212 captured from these sensors may be used for training the image processing component 308 to predict depth data for a given 2D captured image. Data from inertial sensors of the 3D image capture device may be used as additional training input to the image processing component 308. This may provide additional context to the network relating to the 2D image input. For example, the sensor data may measure when the 3D image capture device was moving quickly during the image capture, and thus an image captured at that point might contain motion blur and may not provide a strong contribution to the depth map prediction. The network may learn associations between the motion of the device and the quality of the captured image in this way, which may lead to improved accuracy in the predicted depth map.

In this case, motion data from the 3D image capture device used for training may also capture device motion data 212, as described earlier with reference to FIGS. 4C and 4D. The image processing component is thus trained to process both the device motion data 212 and 2D training images 206 to predict an estimated depth map. This data may enable the image processing component 308 to learn associations between device motion and captured images and depth data, as described earlier. The network parameters are updated to minimise a loss function 312 as described above.

At inference, where the trained image processing component is being used, for example, as part of an anti-spoofing system, the device motion data of the user device 102 may be collected to provide an additional device motion input 712 to the trained image processing component 308. The image processing component 308 then produces a predicted depth map 710 based on both the input verification video 600 and the device motion data 712.

Correlation with Device Motion

The above-described method of anti-spoofing based on estimated depth maps may be used in combination with one or more methods of anti-spoofing or liveness detection to determine whether a captured entity is a real human.

One example liveness detection method uses the motion of the device and compares this with the estimated motion of the captured entity based on changes in 3D estimated face poses, where a spoofing entity may present a video of a moving face without moving the image capture device 102 itself, and the system would identify that the motion of the device 102 does not correlate with the motion of the captured entity. 3D face poses may be estimated from the 2D images by identifying points on the face, which may be referred to as 'landmark detection', and comparing these with a 3D face model. Further details about motion-based liveness detection methods which may be used in combination with the depth estimation network described above are disclosed in U.S. patent Ser. No. 10/546,183, which is incorporated herein by reference in its entirety.

The depth estimation based anti-spoofing network is robust to most replay attacks, as the depth estimation network will typically recognise features of a device screen used to display a video and predict a depth map identifying the spoofing entity as having been presented on a screen. However, in exceptional cases, a high quality video may be presented to the 2D image capture device 102 such that any features such as glare or background image data, which would typically identify a screen, have been removed or avoided. Alternatively, a spoofing video may be presented to the anti-spoofing system at the software level along with captured image frames. In this case, combining the image processing component 308 with a motion-based liveness detection method may provide a more robust anti-spoofing system.

Use Cases

The above system for detecting spoofing attacks may be used in a number of different user authentication systems. For example, the access control system 610 may contain one or more modules for biometric authentication, such as fingerprint or facial recognition. These modules assess if the biometrics supplied by the user of the device match those of the verified user. If the user-supplied biometrics do match those of the verified user, and the image captured is of an actual human, as determined by the anti-spoofing module 602, the user is granted access to the restricted function 606.

A facial recognition module may use an image processing component to identify features of the user 100 to be authenticated. In addition to features of the user 100, the facial recognition module may also learn to identify features of images captured by the device typically used by a given user. For example, if a particular user device 102 belonging to a given user typically captures images which are slightly distorted in a particular way, the network may identify the user by both their captured facial features and the image features specific to that user device 102. There are two 'layers' of authentication, where the user themselves is identified based on captured features of their face, and the device of the user is also identified implicitly based on features of the captured images. This may be useful, for example, if a spoofing attempt uses a real image of the user to be authenticated but uses a different user device to that typically used by the user. In this case, the network may recognise from visual features of the captured image that the image did not come from the user's usual device.

The use of estimated depth data for facial recognition or biometric authentication more generally means that 3D biometric characteristics can be taken into account even when the user does not have access to 3D image capture equipment.

Another example authentication module may use sensor data from sensors of the image capture device, such as gyroscopes, accelerometers, etc. to detect differences in device motion between different users, where users have different patterns of motion. This method of authentication may be referred to as 'behavioural biometrics'. A method of identifying users based on the motion of the user device is disclosed in United States Patent Application Publication No. 2020/0320184, entitled "Biometric User Authentication," which is incorporated herein by reference in its entirety.

The anti-spoofing module 602 may be used in automated age estimation. A user may be required to prove their age, for example when purchasing alcohol or trying to access age restricted material online. Other example use-cases include age estimation at a self-checkout terminal, gambling terminal, vending machine or other age-restricted terminal, to avoid or reduce the need for manual age verification to authorize the use of such terminals. A user may provide proof of his age using age estimation techniques, where, for example, the user's age is estimated using facial and speech characteristics. The anti-spoofing module 602 may be used alongside the modules required for age estimation to verify that any image data supplied is of an actual human. This reduces the ability of users to spoof the age estimation system by using images of people who meet the age requirements of the age restricted content or activity.

It will be appreciated that, whilst specific embodiments of the invention have been described, these are not exhaustive. The scope of the invention is not defined by the described embodiment but only by the appendant claims.

Facial Reconstruction

In one example application, a depth network comprising the image processing component 308 may be used to output a feature map (estimated depth map) for the purposes of constructing a 3D face model, for example to produce customised face masks or other custom-fit facial garments for individuals based on their face shapes. Custom garment fitting can be applied to other human body parts (e.g. custom fit gloves or socks for hands, feet etc.).

In this case, the network 308 may be trained using face scan data obtained from user devices which are equipped with depth sensors, such as an infrared scanner, which determine a depth map of the face, as described above for 3D image capture devices. This depth map may comprise a number of points in 3D space which define the 2D surface of the user's face.

A custom garment can be constructed using the facial reconstruction automatically using 3D printing technology. A suitable garment design derived from the facial reconstruction is provided to a 3D printer in order to construct the garment.

The face reconstruction application may be provided to users of a mobile device as a mobile application. FIG. 18 shows the collection of depth data from users of a mobile device 102. Users of mobile devices 102 which have depth sensors may be requested, by the mobile app, to enable the depth sensors to be used with the mobile application and to provide 2D images and depth maps to the application. This data may be stored in a training database to train (or re-train) the network at a later time.

In the example of FIG. 18, the training images are captured from end-users of the system, primarily to allow those users to access service(s) provided by the system. These may be users with "higher-end" devices that include 3D imaging equipment. For example, such images may be primarily used for authentication and/or anti-spoofing, to enable those users to access protected service(s) or functions within the system, or as part of the service itself (e.g. to provide a customized facial garment, as in the above example). The present disclosure recognizes that such images can additionally be used in the present training context, in order to provide equivalent functions to other users with "lower-end" devices having only 2D imaging equipment.

Estimated depth maps predicted by the image processing component 308 may subsequently be provided to a mask fitting tool to determine a facial model from which a custom mask may be produced. The depth estimation may be used to create a point cloud, which is interpolated to form the surface of the user's face. Facial features may be fit to models such as, for example, a Gaussian curve which may be used to model the bridge of the nose.

A first aspect herein provides a method of training an image processing component to extract depth information from 2D images, the method comprising:

training the image processing component to process 2D images of human body parts according to a set of image processing parameters, in order to extract, from the 2D images, depth information about the human body parts captured therein;

wherein the image processing parameters are learned during the training from a training set of captured 3D training images, each 3D training image of a human body part and captured using 3D image capture equipment and comprising 2D image data and corresponding depth data, by:

processing the 2D image data of each 3D training image according to the image processing parameters, so as to compute an image processing output for comparison with the corresponding depth data of that 3D image, and adapting the image processing parameters in order to match the image processing outputs to the corresponding depth data, thereby training the image processing component to extract depth information from 2D images of human body parts.

Each 3D training image may be of a human face, the image processing component trained to extract depth information about human faces.

However, as noted, the application of the method is not limited to faces. For example, each 3D training image may of a human hand, the image processing component trained to extract depth information about human hands.

Each 3D training image may be a video image of the human body part.

The 2D image data may be in the form of a time sequence of multiple 2D training images that are inputted to the image processing component, the corresponding depth data being a time sequence of depth data. The time sequence of depth data may be transformed into a single 3D human body part model, the image processing output for each 3D training image being derived from the multiple 2D images and being matched to the single 3D human body part model.

For example, the single 3D human body part model may be an aggregate 3D human body part model, generated by aggregating depth data captured at different times, compensating for motion of the 3D image capture equipment and/or the human body part.

For example, the time sequence of depth data may capture the human body part at different poses and/or scales, and the sequence of depth data may be transformed to compensate for the different poses and/or scales.

The static 3D human body part model may be a static depth image showing the human body part at a single pose and scale.

Each 3D training image may be captured using moving 3D image capture equipment, the 3D training image associated with motion data for tracking the movement of the 3D image capture equipment.

The motion data may be inputted to the image processing component with the 2D image data for use by the image processing component in computing the image processing output.

Alternatively or additionally, the motion data may be used to compensate for the movement of the 3D image capture equipment in transforming the time sequence of depth data.

Each 3D training image may be captured using moving 3D image capture equipment, the 3D training image associated with motion data for tracking the movement of the 3D image capture equipment, The multiple 2D images may be encoded as an input tensor, the image processing component having a convolutional neural network architecture that processes the input tensor in order to compute the image processing output in the form of an output tensor for matching with the static 3D human body part model.

The 3D training images may be collected from multiple user devices each equipped with 3D image capture equipment.

Each of the 3D training images may be captured from a user of a service or protected function provided by a computer system, and processed in order to render that service or function accessible to the user, the 3D training image additionally being retained for the purpose of training the image processing component.

In that case, the depth data captured using the 3D image capture equipment may be used primarily to authenticate the user, or to provide them with a custom-fit garment etc., but is additionally retained for training, to allow such services to be provided to users whose devices lack such 3D image capture equipment.

The 3D training image may be:
used in an authentication or anti-spoofing process that is performed in order to determine whether to grant the user to access the service or protected function, or
processed as part of the service, in order to extract a set of measurements for creating a custom-fit garment for the user.

Another aspect disclosed herein provides executable instructions embodied in non-transitory computer-readable storage, the executable instructions configured, when executed on one or more hardware processors, to implement:
a machine learning image processing component configured to:
receive a 2D image captured by a 2D image capture device, and
extract, from the 2D image, depth information about a human body part captured therein, according to a set of learned image processing parameters, the image processing parameters having been learned from 3D training images captured using 3D image capture equipment.

The 2D image may be a 2D video image of the human body part.

The depth information may take the form of a single 3D human body part model computed from multiple 2D image frames of the 2D video image.

The image processing component may be configured to receive motion data captured simultaneously with the 2D video image using one or more motion sensors, and process the 2D video image and the motion data according to the learned image processing parameters in order to extract the depth information.

The 2D video image may capture the human body part at different scales and/or poses.

The static 3D human body part model may take the form of a static depth image of the human body part at a single depth and scale.

The executable instructions may be configured to:
receive motion data captured, simultaneously with the 2D video image, via a motion sensor coupled to the 2D image capture device;
compare the 2D video image with the received motion data, to verify that movement the human body part in the video image corresponds to motion of the 2D image capture device indicated by the motion data.

A further aspect provides a computer system comprising:
an input configured to receive a 2D image captured by a 2D image capture device; and
one or more processors configured to implement a machine learning image processing component, the machine learning image processing component configured to extract, from the 2D image, depth information about a human body part captured therein, according to a set of learned image processing parameters, the image processing parameters having been learned from 3D training images captured using 3D image capture equipment.

The computer system may comprise:
a 3D printing system arranged to construct a custom-fit garment using the depth information about the human body part.

The 2D image may be a video image, and the depth information may take the form of a static 3D human body part model computed from multiple 2D image frames of the 2D video image.

Further aspects herein provide a method of configuring an anti-spoofing system to detect if a spoofing attack has been attempted, the method comprising: training an image processing component of the anti-spoofing system to process 2D verification images according to a set of image processing parameters, in order to extract depth information from the 2D verification images; and wherein the configured anti-spoofing system comprises an anti-spoofing component which uses an output from the processing of a 2D verification image by the image processing component to determine whether an entity captured in that image corresponds to an actual human or a spoofing entity; wherein the image processing parameters are learned during the training from a training set of captured 3D training images of both actual humans and spoofing entities, each 3D training image captured using 3D image capture equipment and comprising 2D image data and corresponding depth data, by: processing the 2D image data of each 3D training image according to the image processing parameters, so as to compute an image processing output for comparison with the corresponding depth data of that 3D image, and adapting the image processing parameters in order to match the image processing outputs to the corresponding depth data, thereby training the image processing component to extract depth information from 2D verification images captured using a 2D image capture device.

A classification component of the anti-spoofing component may be configured to classify each of the 2D verification images, in relation to real and spoofing classes, respectively, to 2D verification images of actual humans and 2D verification images of spoofing entities, using the output from the processing of that image by the image processing component, for use in making said determination.

The 2D verification image may be a facial image.

The image processing parameters may be adapted to match the image processing outputs to the corresponding depth data based on a loss function, which provides a measure of difference between each of the image processing outputs and the corresponding depth data.

The loss function may be a relative depth loss function which provides a measure of difference between a relative depth order of different image points predicted in each image processing output and a relative depth of those features in the corresponding depth data, without penalizing discrepancies in the absolute depth of those features when their relative depth has been predicted correctly.

The image processing component may comprise a plurality of neural network processing layers. The neural network processing layers may comprise convolutional neural network (CNN) processing layers.

The classification component of the anti-spoofing system may classify images according to a set of classification parameters, which are learned from example 2D verification images labelled with anti-spoofing classification labels.

The example 2D verification images may be 2D components of the 3D training images.

The image processing component may be trained in a pre-training phase, and the classification component may be subsequently trained to learn the classification parameters in a fine-tuning phase.

The learned image processing parameters may be frozen in the fine-tuning phase. Alternatively, small changes may be permitted to tune the parameters based on the classification error.

The classification component may comprise at least one neural network processing layer. The neural network processing layer of the classification component may be fully connected.

The anti-spoofing system may comprise a feature processing component which refines the output prior to classification based on a set of learned feature processing parameters.

The feature processing parameters may be learned in the fine-tuning phase simultaneously with the classification parameters.

The output used to make said determination may comprise the extracted depth information.

The output used to make said determination may comprise an output of at least one hidden layer of the image processing component.

The training may be based on a regression loss function, which penalises deviations between the image processing outputs and the corresponding depth data, each image processing output in the form of an estimated depth map and the depth data of each 3D training image being in the form of a ground truth depth map.

The training may be based on an ordinal regression loss function, defined with respect to a set of depth classes in the manner that encodes a relative ordering of the depth classes, wherein the depth data of each 3D training image is used to derive ground truth depth classification data for each image, to which the image processing outputs are matched in training.

The anti-spoofing system may further comprise at least one patch-based anti-spoofing classifier, which classifies each of multiple image patches within an inputted 2D image in relation to real and spoofing classes, wherein the patch-based anti-spoofing classifier is trained such that different image patches of the inputted 2D image may be differently classified in relation to those classes, wherein the patch-based anti-spoofing classifier is trained using at least one of: the 2D image data of the 3D training images, and a separate set of 2D verification training images.

The anti-spoofing system may use the combination of classification by the classification component of the 2D verification image and the classifications of the patches within that 2D verification image by the patch-based anti-spoofing classifier in order to determine whether the entity is an actual human or a spoofing entity.

The patch-based anti-spoofing classifier may have a convolutional neural network (CNN) architecture, wherein each image patch is defined by a configuration of convolutional filtering layers within the CNN architecture, the configuration of the convolutional filtering layers such that the image patches are overlapping.

A further aspect of the present invention relates to a computer system for performing anti-spoofing based on 2D verification images, the computer system comprising: an image input configured to receive a 2D verification image captured by a 2D image capture device; a machine learning image processing component configured to extract depth information from the 2D verification image according to a set of learned image processing parameters, the image processing parameters having been learned from 3D training images captured using 3D image capture equipment; and an anti-spoofing component configured to use the extracted depth information to determine whether an entity captured in the 2D verification image corresponds to an actual human or a spoofing entity.

The anti-spoofing component may comprise a classification component configured to use the extracted depth information to classify the 2D verification image in relation to real and spoofing classes corresponding, respectively, to 2D verification images of actual humans and 2D verification images of spoofing entities for making said determination.

The computer system may comprise an illumination controller configured to generate a control output to cause an illumination component to illuminate a field of view of the image capture device whilst the 2D verification image is captured, wherein the depth information is extracted based on resulting illumination effects captured in the 2D verification image.

The illumination effects may comprise at least one of glare and shadow effects.

The computer system may comprise an access controller configured to regulate access to a restricted function based said determination by the anti-spoofing component.

The 2D verification image may be a static image. The 2D verification image may be a video image comprising a sequence of video frames.

The image processing component may comprise a plurality of CNN layers.

The anti-spoofing component may further comprise at least one patch-based anti-spoofing classifier, which separately classifies each of multiple image patches within the 2D verification image in relation to real and spoofing classes whereby different image patches may be classified differently in relation to those classes, and wherein the anti-spoofing component uses the extracted depth information together with the classifications of the multiple image patches by the patch-based anti-spoofing classifier to determine whether the entity is an actual human or a spoofing entity.

The anti-spoofing component may use the combination of the classification of the 2D verification image by the classification component together with the classifications of the image patches to make said determination.

The anti-spoofing component is configured o assign an anti-spoofing score to each pixel of at least some pixels of the 2D verification image, by determining a subset of the image patches containing that pixel, and assigning the anti-spoofing score to the pixel based on local classification scores assigned to the subset of image patches by the patch-based anti-spoofing classifier.

The anti-spoofing score may be computed as an average of the local classification scores assigned to the subset of image patches.

The patch-based anti-spoofing classifier may have a convolutional neural network (CNN) architecture, wherein each of the multiple image patches is defined by a configuration of convolutional filtering layers within the CNN architecture, and the configuration of the convolutional filtering layers is such that the image patches are overlapping.

The at least one patch-based anti-spoofing classifier may comprise: a first patch based anti-spoofing classifier, trained to distinguish between images of actual human faces and images of a first type of spoofing attack; a second patch-based anti-spoofing classifier, trained to distinguish between images of actual human faces and images of a second type of spoofing attack, the second type of spoofing attack different tat the first type of spoofing attack.

The first type of anti-spoofing attack may include mask and/or cut-out attacks, and the second type of spoofing attack may include print and/or replay attacks.

It should be understood that the terminology "classifying in relation to real and anti-spoofing classes" does not necessarily imply a binary classification (the classification may or may not be binary), but more generally implies a classification task where at least one class corresponds to real humans and at least one corresponds to spoofing entity. For example, the classification task may be defined over multiple classes corresponding to different types of spoofing entity/attack. Conceptually, these may be considered "sub-classes" of a broader anti-spoofing class corresponding to spoofing attacks generally, and the terminology "classifying in relation to real and anti-spoofing classes" encompasses a multi-classification task which is explicitly formulated over sub-classes of one or both of those broader classes.

For example, as an alternative to providing first and second patch-based anti-spoofing classifiers, a single patch-based classifier may be explicitly defined over at least three classes: one real class, a second spoofing sub-class corresponding to a first type of attack (e.g. cut-out/mask), and a third spoofing sub-class correspond to a second type of attack (e.g. print/replay).

Another aspect of the present invention relates to an anti-spoofing system comprising a depth estimation component configured to receive a 2D verification image captured by a 2D image capture device and to extract estimated depth information therefrom; a global anti-spoofing classifier configured to use the extracted depth information to classify the 2D verification image in relation to real and spoofing classes corresponding, respectively, to 2D verification images of actual humans and 2D verification images of spoofing entities, and thereby assign a global classification value to the whole of the 2D verification image; and a patch-based anti-spoofing classifier configured to classify each image patch of multiple image patches of the 2D verification image in relation to the real and anti-spoofing classes, and thereby assign a local classification value to each image patch of the multiple image patches; wherein the anti-spoofing system is configured to use the global and local classification values to determine whether an entity captured in the 2D verification image corresponds to an actual human or a spoofing entity.

The depth estimation component may be a machine learning component which has been trained using 3D images captured using 3D imaging equipment.

The anti-spoofing system may comprise a second patch-based anti-spoofing classifier configured to classify each image patch of multiple image patches of the 2D verification image in relation to the real and anti-spoofing classes, and thereby assign a second local classification value to each image patch of the multiple image patches; wherein first patch-based anti-spoofing classifier is configured to distinguish between images of actual human faces and images of a first type of spoofing attack, and the second patch-based anti-spoofing classifier is configured to distinguish between images of actual human faces and images of a second type of spoofing attack, the second type of spoofing attack different than the first type of spoofing attack.

The first type of spoofing attack may include mask and/or cut-out attacks, and the second type of spoofing attack may include print/and/or replay attacks.

Another aspect of the present invention relates to a patch-based anti-spoofing classifier embodied in a computer system and comprising a series of convolutional filtering layers, a first of which is configured to receive a 2D verification image and apply convolutional filtering thereto, wherein subsequent filtering layers of the series are configured to apply convolutional filtering to the outputs of previous convolutional filtering layers of the series; a classification layer configured to compute local classification values for respective image patches within the 2D verification image, based on the convolutional filtering by the convolutional filtering layers, wherein each image patch is defined by a configuration of the convolutional filtering layers, wherein each local classification value classifies each image patch in relation to real and anti-spoofing classes corresponding, respectively, to 2D verification images of actual humans and spoofing entities.

The convolutional layers may apply filters with respective strides and respective perceptive fields, wherein each mage patch has a size dependent on the perceptive fields, and the number of image patches is dependent on the strides and the size of the 2D verification image.

Another aspect of the present invention relates to a computer program product comprising computer readable instructions stored on a non-transitory computer readable storage medium and which, when executed, is configured to implement a method comprising: training an image processing component of the anti-spoofing system to process 2D verification images according to a set of image processing parameters, in order to extract depth information from the 2D verification images; and wherein the configured anti-spoofing system comprises an anti-spoofing component which uses an output from the processing of a 2D verification image by the image processing component to determine whether an entity captured in that image corresponds to an actual human or a spoofing entity; wherein the image processing parameters are learned during the training from a training set of captured 3D training images of both actual humans and spoofing entities, each 3D training image comprising 2D image data and corresponding depth data, by: processing the 2D image data of each 3D training image according to the image processing parameters, so as to compute an image processing output for comparison with the corresponding depth data of that 3D image; and adapting the image processing parameters in order to match the image processing outputs to the corresponding depth data, thereby training the image processing component to extract depth information from 2D verification images.

By training the image processing component using the disclosed method, it can learn to infer depth information from 2D images. The depth knowledge can then be used by the anti-spoofing system to determine if the 2D verification image is of an actual human or a spoofing entity based on the differences between their inferred depth characteristics.

The invention is particularly effective in combatting spoofing attacks using 2D spoofing entities such as photographs or videos but is effective in any context in which a spoofing entity exhibits differing depth characteristics to an actual human which can be inferred from a 2D verification image.

Another aspect of the invention provides a method of configuring an anti-spoofing system to detect if a spoofing attack has been attempted, the method comprising: training an image processing component of the anti-spoofing system to process 2D verification images according to a set of image processing parameters, in order to extract depth information from the 2D verification images; and wherein the configured anti-spoofing system comprises an anti-spoofing component which uses an output from the processing of a 2D verification image by the image processing component to determine whether an entity captured in that image corresponds to an actual human or a spoofing entity; wherein the image processing parameters are learned during the training from a training set of captured 3D training images of both actual humans and spoofing entities, each 3D training image comprising 2D image data and corresponding depth data, by: processing the 2D image data of each 3D training image according to the image processing parameters, so as to compute an image processing output for comparison with the corresponding depth data of that 3D image, and adapting the image processing parameters in order to match the image processing outputs to the corresponding depth data, thereby training the image processing component to extract depth information from 2D verification images.

A further aspect of the invention provides a computer system for performing anti-spoofing based on 2D verification images, the computer system comprising: an image input configured to receive a 2D verification image captured by an image capture device; a machine learning image processing component configured to extract depth information from the 2D verification image according to a set of learned image processing parameters, the image processing parameters having been learned from 3D training images; and an anti-spoofing component configured to use the extracted depth information to determine whether an entity captured in the 2D verification image corresponds to an actual human or a spoofing entity.

The invention claimed is:

1. An anti-spoofing system comprising:
a data store comprising computer-executable instructions; and
a processor configured to execute the computer-executable instructions to implement:
a depth estimation component configured to receive a 2D verification image captured by a 2D image capture device and to extract estimated depth information therefrom;
a global anti-spoofing classifier configured to use the extracted depth information to classify the 2D verification image in relation to real and spoofing classes corresponding, respectively, to 2D verification images of actual humans and 2D verification images of spoofing entities, and thereby assign a global classification value to the whole of the 2D verification image; and
a patch-based anti-spoofing classifier configured to classify each image patch of multiple image patches of the 2D verification image in relation to the real and spoofing classes, and thereby assign a local classification value to each image patch of the multiple image patches;
wherein the anti-spoofing system is configured to use the global and local classification values to determine whether an entity captured in the 2D verification image corresponds to an actual human or a spoofing entity;
wherein the patch-based anti-spoofing classifier has a convolutional neural network (CNN) architecture, wherein each of the multiple image patches is defined by a configuration of convolutional filtering layers within the CNN architecture;
wherein the configuration of the convolutional filtering layers is such that the image patches are overlapping.

2. The anti-spoofing system of claim 1, wherein the depth estimation component is a machine learning component which has been trained using 3D images captured using 3D imaging equipment.

3. The anti-spoofing system of claim 1, wherein the convolutional layers apply filters with respective strides and respective perceptive fields, wherein each image patch has a size dependent on the perceptive fields, and the number of image patches is dependent on the strides and the size of the 2D verification image.

4. The anti-spoofing system of claim 1, comprising:
a second patch-based anti-spoofing classifier configured to classify each image patch of multiple image patches of the 2D verification image in relation to the real and anti-spoofing classes, and thereby assign a second local classification value to each image patch of the multiple image patches;
wherein first patch-based anti-spoofing classifier is configured to distinguish between images of actual human faces and images of a first type of spoofing attack, and the second patch-based anti-spoofing classifier is configured to distinguish between images of actual human faces and images of a second type of spoofing attack, the second type of spoofing attack different than the first type of spoofing attack.

5. The anti-spoofing system of claim 4, wherein the first type of spoofing attack includes mask and/or cut-out attacks, and the second type of spoofing attack includes print and/or replay attacks.

6. The anti-spoofing system of claim 1, wherein the anti-spoofing system is configured to assign an anti-spoofing score to each pixel of at least some pixels of the 2D verification image, by determining a subset of the image patches containing that pixel, and assigning the anti-spoofing score to the pixel based on local classification scores assigned to the subset of image patches by the patch-based anti-spoofing classifier.

7. The anti-spoofing system of claim 6, wherein the anti-spoofing score is computed as an average of the local classification scores assigned to the subset of image patches.

8. A system comprising:
a data store comprising computer-executable instructions; and
a processor configured to execute the computer-executable instructions to implement a patch-based anti-spoofing classifier, wherein the patch-based anti-spoofing classifier is configured to classify each image patch of multiple image patches of a 2D verification image captured by a 2D image capture device in relation to real and spoofing classes, and thereby assign a local classification value to each image patch of the multiple image patches, wherein the patch-based anti-spoofing classifier has a convolutional neural network (CNN) architecture, wherein each of the multiple image patches is defined by a configuration of convolutional filtering layers within the CNN architecture, wherein the configuration of the convolutional filtering layers is such that the image patches are overlapping, the patch-based anti-spoofing classifier comprising:

a series of convolutional filtering layers, a first of which is configured to receive a 2D verification image and apply convolutional filtering thereto, wherein subsequent filtering layers of the series are configured to apply convolutional filtering to outputs of previous convolutional filtering layers of the series; and a classification layer configured to compute local classification values for respective image patches within the 2D verification image, based on the convolutional filtering by the convolutional filtering layers, wherein each image patch is defined by a configuration of the convolutional filtering layers, wherein each local classification value classifies each image patch in relation to real and anti-spoofing classes corresponding, respectively to 2D verification images of actual humans and spoofing entities.

9. The patch-based anti-spoofing classifier of claim 8, wherein the convolutional layers apply filters with respective strides and respective perceptive fields, wherein each image patch has a size dependent on the perceptive fields, and the number of image patches is dependent on the strides and the size of the 2D verification image.

10. One or more non-transitory computer-readable media comprising computer readable instructions that, when executed by one or more processors, implement an anti-spoofing system comprising:

a depth estimation component configured to receive a 2D verification image captured by a 2D image capture device and to extract estimated depth information therefrom;

a global anti-spoofing classifier configured to use the extracted depth information to classify the 2D verification image in relation to real and spoofing classes corresponding, respectively, to 2D verification images of actual humans and 2D verification images of spoofing entities, and thereby assign a global classification value to the whole of the 2D verification image; and a patch-based anti-spoofing classifier configured to classify each image patch of multiple image patches of the 2D verification image in relation to the real and anti-spoofing classes, and thereby assign a local classification value to each image patch of the multiple image patches;

wherein the anti-spoofing system is configured to use the global and local classification values to determine whether an entity captured in the 2D verification image corresponds to an actual human or a spoofing entity;

wherein the patch-based anti-spoofing classifier has a convolutional neural network (CNN) architecture, wherein each of the multiple image patches is defined by a configuration of convolutional filtering layers within the CNN architecture;

wherein the configuration of the convolutional filtering layers is such that the image.

* * * * *

UNITED STATES PATENT AND TRADEMARK OFFICE
CERTIFICATE OF CORRECTION

PATENT NO. : 11,941,918 B2
APPLICATION NO. : 18/301147
DATED : March 26, 2024
INVENTOR(S) : Symeon Nikitidis et al.

Page 1 of 1

It is certified that error appears in the above-identified patent and that said Letters Patent is hereby corrected as shown below:

In the Specification

Column 1, Line 29, delete "screen" and insert -- screen. --.

Column 3, Line 19, delete "information." and insert -- information; --.

Column 8, Line 7, delete "in in" and insert -- in --.

Column 20, Line 9, delete "in in" and insert -- in --.

Column 20, Line 9, delete "10/546,183," and insert -- 10,546,183, --.

Column 21, Line 62, delete "10/546,183," and insert -- 10,546,183, --.

Column 24, Line 10, delete "10/546,183," and insert -- 10,546,183, --.

Column 27, Line 15, delete "equipment," and insert -- equipment. --.

Column 30, Line 48, delete "based" and insert -- based on --.

Column 31, Line 3, delete "configured o" and insert -- configured to --.

Signed and Sealed this
Eighth Day of October, 2024

Katherine Kelly Vidal
*Director of the United States Patent and Trademark Office*